(12) United States Patent
Mendiola et al.

(10) Patent No.: US 10,979,498 B2
(45) Date of Patent: Apr. 13, 2021

(54) SYSTEM, METHOD AND DEVICE FOR PROVISION AND MANAGEMENT OF WEB RESOURCE

(71) Applicant: VOXP PTE. LTD., Singapore (SG)

(72) Inventors: Dennis Beltran Mendiola, Ventura, CA (US); Patrick Gil Gorres Cagalawan, Misamis Oriental (PH)

(73) Assignee: VOXP PTE. LTD., Singapore (SG)

( * ) Notice: Subject to any disclaimer, the term of this patent is extended or adjusted under 35 U.S.C. 154(b) by 0 days.

(21) Appl. No.: 16/266,917

(22) Filed: Feb. 4, 2019

(65) Prior Publication Data

US 2019/0245917 A1    Aug. 8, 2019

(30) Foreign Application Priority Data

Feb. 5, 2018 (SG) .............. 10201800991V

(51) Int. Cl.
| | |
|---|---|
| H04L 29/08 | (2006.01) |
| G06Q 50/00 | (2012.01) |
| H04L 29/06 | (2006.01) |
| H04L 12/24 | (2006.01) |

(52) U.S. Cl.
CPC ......... *H04L 67/1076* (2013.01); *G06Q 50/01* (2013.01); *H04L 41/16* (2013.01); *H04L 63/166* (2013.01); *H04L 67/02* (2013.01); *H04L 67/1095* (2013.01); *H04L 67/2842* (2013.01)

(58) Field of Classification Search
CPC ............. H04L 67/1076; H04L 67/2842; H04L 63/166; H04L 67/1095
USPC .......................... 709/202, 219, 223, 226, 230
See application file for complete search history.

(56) References Cited

U.S. PATENT DOCUMENTS

| | | | | |
|---|---|---|---|---|
| 9,413,779 B2* | 8/2016 | Vasseur | ........... | G06N 20/00 |
| 10,122,607 B2* | 11/2018 | Luna | ........... | H04W 40/248 |
| 2005/0111362 A1* | 5/2005 | Freytsis | ........... | H04L 47/50 |
| | | | | 370/230 |
| 2013/0242903 A1* | 9/2013 | Narkar | ........... | H04L 47/72 |
| | | | | 370/329 |

(Continued)

OTHER PUBLICATIONS

"Intelligent Web Caching Using Machine Learning Methods"—Sulaiman et al, Neural Network World, May 2011 https://www.researchgate.net/profile/Sarina_Sulaiman2/publication/228517481 (Year: 2011).*

Primary Examiner — Randy A Scott
(74) Attorney, Agent, or Firm — JCIP; Joseph G. Chu; Jeremy I. Maynard

(57) ABSTRACT

Disclosed is a system for the provision and management of web resource including a node server configured to store a plurality of web resource usage profiles associated with one or more users, the node server comprises a local cache to store web resources;
a switch server arranged in signal communication with the node server and configured to switch the provision of web resource between a first mode and a second mode;
wherein the node server is connectable to at least one of a local and a global network; and wherein in the first mode the node server retrieves web resource from the local cache; and in the second mode the node server retrieves web resource from at least one of the local and the global network. A device in the form a node server and a method using the node server to provide and manage web resource are also disclosed.

17 Claims, 5 Drawing Sheets

(56) References Cited

U.S. PATENT DOCUMENTS

| | | | |
|---|---|---|---|
| 2014/0149592 A1* | 5/2014 | Krishna | G06F 1/329 |
| | | | 709/226 |
| 2015/0372954 A1* | 12/2015 | Dubman | H04L 43/026 |
| | | | 709/206 |
| 2017/0149689 A1* | 5/2017 | Norman | H04L 67/18 |
| 2018/0083896 A1* | 3/2018 | Jayaram | H04L 51/04 |
| 2018/0199375 A1* | 7/2018 | Nezou | H04W 74/0816 |

* cited by examiner

SYSTEM, METHOD AND DEVICE FOR PROVISION AND MANAGEMENT OF WEB RESOURCE

RELATED APPLICATION

This application claims priority to, and the benefits of, the Singapore Patent Application No. 10201800991V filed on Feb. 5, 2018, the content of which is incorporated by reference in its entirety herein.

FIELD OF THE INVENTION

The invention relates to a system, method and device for provision and/or management of intranet and/or Internet resources.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

In recent years, the advent of Internet and technology has enabled residents of rural areas and members of developing countries better access to web resource which include websites, multimedia and social media platforms, in part to stay connected with other residents or friends. There also exist intelligent systems which are able to provide Internet bandwidth on differentiated price plans or with some form of prioritization of the type of Internet resource(s). This may involve the use of specialized dedicated software applications colloquially referred to as 'apps', along with the modification of a telecommunications in-house Internet servers and "edge routers" to identify which user activities are to be whitelisted or blocked or throttled. However, there exists scarcity of the "last mile" frequency bands (those that are used for connecting one or more mobile communication devices or phones to a telecommunications carrier and/or Mobile Network Operator (MNO)) which has proven to be a challenging bottleneck in terms of being able to offer affordable connectivity, especially given a massive user base that gorges on the Internet rather voraciously.

It does not help that the likes of Facebook™ and Google™ dish out contents for as long as the user's mobile communication device accepts them. They could not care less if a MNO's pipes are running at capacity. Some of the reasons there never seems to be enough Internet for all.

Developing market MNOs have the challenge of connecting people using equipment designed for the developed markets such as the U.S. in which ARPU runs in the USD 50 range a month range versus the sub USD 2.00 of the Philippines. The frequency bands used by MNOs for backhaul and last mile purposes can only accommodate so much data and so many users. To cover more people means to re-use frequencies by installing more backhaul points and more cellular base stations for last mile connectivity. This is an unprofitable proposition for many areas in the developing world, most especially in rural areas.

There is a facet of connectivity, however, that can accommodate many more users at a fraction of the cost compared to cellular 3G/4G/LTE: Wi-Fi™ bands/frequencies that run on the license-free 2.4 Ghz and 5.8 Ghz spectra and backhauled via fiber, copper or microwave. Wi-Fi™ access points had been designed to have limited power and range, so that the same channels can be reused by the general population in their homes and well defined areas (e.g. micro-geo-fenced, at approximately 100 feet indoors or as far 600 feet outdoors) with minimal interference using standard home routers. (With specialized and directional antennas, these Wi-Fi™ hotspots can cover much farther.)

At present, most national infrastructure for supporting and providing Internet services are provided on an ad-hoc basis, i.e. service providers such as telecommunications carriers develop their backhaul systems (for Wi-Fi™ or 3G/4G/LTE networks). Telecommunications carriers are driven by profits and therefore they may not deem it profitable from a commercial/financial sense to provide comprehensive backhaul infrastructure to sparsely populated areas such as rural areas. In addition, the population in such sparsely populated areas may not be able to support expensive Internet connection. The result is therefore that such sparsely populated areas are disadvantaged in their access and quality of Internet service. This is further exacerbated by the relative lack of funds to purchase state of the art computer devices for the people in these rural areas.

With the spectrum to provide wireless network limited, the telecommunications carriers are typically unwilling to invest more capital expenditure (CAPEX) to cover areas with a widely dispersed population, and the practice of capping Internet usage (in terms of megabytes, and oftentimes at absurd cap points, like 35 MB—the equivalent of a contact book refresh and a few videos on Facebook™) becomes the usual. Users in these areas are therefore disadvantaged.

It is an object of the invention to provide Internet and intranet connectivity at a more affordable rate, in part through the management of the web resources in a more reliable and/or efficient manner. It is another object to provide a type of backhaul device suitable for the provision and/or management of the web resources. Herein the invention makes explicit that the connectivity and the delivery of purposeful information can be done via intranet (LAN, wLAN) aside from the more conventional means of access via the cloud (the Internet).

SUMMARY OF THE INVENTION

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

An objective of the invention is to provide web resources including text, video, multimedia and social media contents at highly affordable rates, such as $0.20 a day unlimited, while being able to offer the lowest rates or almost truly free rates for a selected group of people such as public school students and teachers who may lack the means to purchase computers and/or pay for expensive 3G/4G/LTE connection to the Internet.

The inventors have observed how people within developing countries access the Internet for web resource, with 50% of Internet time and volume spent on media streaming services such as video media platform such as Youtube™, another 30-40% on social media platform such as Facebook™, and the rest on ad-hoc browsing and OTT (Over the Top) messaging such as Whatsapp™. In this regard, the inventors have observed that most of the contents delivered are not time-sensitive.

Based on such knowledge, the inventors are able to provide an arrangement of node servers, also known as 'micro-servers', configured with a switch server or a logical switch to switch between a local cache, a local network and/or a global network, to provide a combination of contents retrieved from the Internet and/or intranet and thereby manage web resources provided to a user.

In accordance with an aspect of the disclosure or invention, there is a system for a provision and management of a web resource including: a node server configured to store a plurality of web resource usage profiles associated with one or more users, the node server comprises a local cache to store web resources; and a switch arranged in a signal communication with the node server and configured to switch the provision of the web resource between a first mode and a second mode, wherein the node server is connectable to at least one of a local and a global network; and wherein in the first mode the node server retrieves a web resource from the local cache; and in the second mode the node server retrieves a web resource from the at least one of the local and the global network.

Preferably, the switch is further configured to switch the provision of the web resource to a third mode, wherein in the third mode the node server retrieves each corresponding web resource from both a server database and the global network.

Preferably, the node server comprises at least one of an artificial intelligence engine and machine learning engine.

Preferably, the system further includes one or more Wi-Fi access points, wherein the Wi-Fi access points are linked up wirelessly or wired to the node server.

Preferably, the node server is operable to relay a web resource to another node server.

Preferably, the node server is operable to synchronize a web resource with another node server using a peer-to-peer synchronization program.

Preferably, the node server is operable to access a cloud directly or via another node server.

Preferably, the node server is operable to perform an un-structured cabling installation of the Wi-Fi access points and allow a wireless connection between the Wi-Fi access points so that an indoor access point reaches one or more outdoor access points.

Preferably, the node server is configured to communicate with a user via a bot operating on a social networking service platform, wherein the bot is operable to generate and send a message.

Preferably, the node server is operable to identify the user and determine a web resource usage behaviour of the user based on a historical web resource usage profile associated with the user.

Preferably, the web resource usage profile associated with the user is monitored using the social networking service platform.

Preferably, the web resource usage behaviour of the user is determined based on historical web resource usage profiles associated with other users in an area which is the same to the user.

Preferably, the node server is operable to determine when to switch to another mode, based on the determined web resource usage behaviour of the user.

Preferably, the switch is operable to switch to another mode, based on the message received from the bot.

Preferably, the node server is operable to use a DPI (Deep Packet Inspection) and recognized data patterns to control the switch to switch to another mode.

Preferably, in the second mode the node server is operable to determine whether to connect to the local network or the global network, based on the determined web resource usage behaviour of the user.

Preferably, the node server is operable to obtain a user's identifier of the social networking service platform to identify and authenticate the user.

Preferably, the node server is operable to obtain at least one of activity and interaction with the social networking service platform to identify and authenticate the user.

Preferably, the at least one of activity and interaction includes the user's agreement to term or condition provided by the social networking service platform.

Preferably, the node server is operable to monitor SSL (Secure Sockets Layer) traffic comprising a login interaction for the social networking service platform and conduct a granular traffic shaping, to identify the user and determine the web resource usage behaviour of the user.

Preferably, the node server is operable to decide whether to allow or reject an access to a web resource, based on the web resource usage behaviour of the user.

Preferably, the node server is operable to filter a web resource by observing the SSL traffic and by the granular traffic shaping and provide the filtered web resource determined as essential to the user.

Preferably, while the node server identifies the user and determines the web resource usage behaviour of the user, the node server is operable to use a limited version of the social networking service platform.

Preferably, the node server is operable to detect if the user accesses a web resource that cannot be delivered at predetermined speed or that has been prohibited, and control the bot to send a suggestion message to the user.

Preferably, the node server is operable to implement a Wi-Fi offloading to mirror a user's mobile data plan with an MNO (Mobile Network Operator).

Preferably, the node server is operable to retrieve a mobile number and/or an identifier of a social network service platform, and bind the mobile number and/or the identifier to a MAC address of a user's device.

Preferably, the node server is operable to check if the user has a mobile data plan with the MNO and access a core network of the MNO using a mobile data connection of the user's device, and the core network is operable to inform the node server of whether to enable or not a certain type of Wi-Fi connection.

Preferably, the mobile data connection to the global network is capable of offloading to a Wi-Fi.

Preferably, the system further includes a profiling and recommendation module, wherein the module is operable to inform the user of a web resource or data plan at a predetermined time, based on information extracted from at least one of the social networking service platform and the MNO.

Preferably, a bot is operable to send a message to the user to inform the web resource or data plan, wherein the message contains a button or a link to initiate a purchase of the web resource or data plan.

Preferably, a prepaid wallet or MNO airtime credit from the user's MNO account or third party's MNO account is used for the purchase.

Preferably, the node server is operable to create a unique code to identify which payment request is to be paid, wherein the unique code is included in at least one of an affirmation message, an index and a unique string appended to a shortcode that sends the payment request.

Preferably, the module is operable to charge differently based on the users' ability on payment and a network's capacity on available bandwidth.

Preferably, the web resources are classified based on a characteristic of the web resources, and some web resources which are determined as non-time sensitive are stored on the local cache.

Preferably, the web resources determined as non-time sensitive comprise at least one of the following: video content, education-related content and information content.

Preferably, the local cache is operable to store web resources based on a combination of a request by a user and a request by the artificial intelligence engine and/or the machine learning engine.

Preferably, the web resources are gathered using a predictive and crowd sourced cache-ing technique.

Preferably, the node server is configured to connect to one or more router through the local or the global network, to share a bandwidth of the node server.

Preferably, the node server comprises a blockchain module converting the shared bandwidth into a compensation for a user.

Preferably, the server database is part of a core network of an MNO.

Preferably, the node server is operable to communicate with the core network of the MNO.

Preferably, the switch comprises at least one of a switch server and a logical switch.

Preferably, the node server is operable to determine a minimum allowable speed of a data connection of a user's device and allow one or more functions among a plurality of functions to operate on the user's device and to offer no more than a certain speed of the data connection.

Preferably, when a plurality of users use same contents at the same time in a same cluster or in nearby clusters, the node server and devices of the plurality of users are operable to contribute portions of the contents to distribute a burden of delivering traffic.

Preferably, other node servers and other users' devices are further operable to help in delivering the contents.

Preferably, when the users are idle, the node server is operable to perform regular cycles of disconnection and reconnection to allow timely notification alerts or time-sensitive data.

Preferably, in a case of users in which there is no connection to users' devices, the node server is operable to perform a non-cycling disconnection.

In accordance with another aspect of the disclosure or invention, there is a method for providing and managing a web resource by a node server in a system, the node server connectable to at least one of a local and a global network, including the steps of:—
a. storing web resources in a local cache of the node server;
b. receiving an electronic signal to control a switch to switch from a first mode to a second mode or vice versa; wherein in the first mode the node server retrieves a web resource from the local cache; and in the second mode the node server retrieves a web resource from at least one of the local and the global network.

Preferably, the switch is further configured to switch the provision of the web resource to a third mode, wherein in the third mode the node server retrieves each corresponding web resource from both a server database and the global network.

Preferably, the node server comprises at least one of an artificial intelligence engine and machine learning engine.

Preferably, the system further includes one or more Wi-Fi access points, wherein the Wi-Fi access points are linked up wirelessly or wired to the node server.

Preferably, the node server is operable to relay a web resource to another node server.

Preferably, the node server is operable to synchronize a web resource with another node server using a peer-to-peer synchronization program.

Preferably, the node server is operable to access a cloud directly or via another node server.

Preferably, the node server is operable to perform an un-structured cabling installation of the Wi-Fi access points and allow a wireless connection between the Wi-Fi access points so that an indoor access point reaches one or more outdoor access points.

Preferably, the node server is configured to communicate with a user via a bot operating on a social networking service platform, wherein the bot is operable to generate and send a message.

Preferably, the node server is operable to identify the user and determine a web resource usage behaviour of the user based on a historical web resource usage profile associated with the user.

Preferably, the web resource usage profile associated with the user is monitored using the social networking service platform.

Preferably, the web resource usage behaviour of the user is determined based on historical web resource usage profiles associated with other users in an area which is the same to the user.

Preferably, the node server is operable to determine when to switch to another mode, based on the determined web resource usage behaviour of the user.

Preferably, the switch is operable to switch to another mode, based on the message received from the bot.

Preferably, the node server is operable to use a DPI (Deep Packet Inspection) and recognized data patterns to control the switch to switch to another mode.

Preferably, in the second mode the node server is operable to determine whether to connect to the local network or the global network, based on the determined web resource usage behaviour of the user.

Preferably, the node server is operable to obtain a user's identifier of the social networking service platform to identify and authenticate the user.

Preferably, the node server is operable to obtain at least one of activity and interaction with the social networking service platform to identify and authenticate the user.

Preferably, the at least one of activity and interaction includes the user's agreement to term or condition provided by the social networking service platform.

Preferably, the node server is operable to monitor SSL (Secure Sockets Layer) traffic comprising a login interaction for the social networking service platform and conduct a granular traffic shaping, to identify the user and determine the web resource usage behaviour of the user.

Preferably, the node server is operable to decide whether to allow or reject an access to a web resource, based on the web resource usage behaviour of the user.

Preferably, the node server is operable to filter a web resource by observing the SSL traffic and by the granular traffic shaping and provide the filtered web resource determined as essential to the user.

Preferably, while the node server identifies the user and determines the web resource usage behaviour of the user, the node server is operable to use a limited version of the social networking service platform.

Preferably, the node server is operable to detect if the user accesses a web resource that cannot be delivered at predetermined speed or that has been prohibited, and control the bot to send a suggestion message to the user.

Preferably, the node server is operable to implement a Wi-Fi offloading to mirror a user's mobile data plan with an MNO (Mobile Network Operator).

Preferably, the node server is operable to retrieve a mobile number and/or an identifier of a social network service platform, and bind the mobile number and/or the identifier to a MAC address of a user's device.

Preferably, the node server is operable to check if the user has a mobile data plan with the MNO and access a core network of the MNO using a mobile data connection of the user's device, and the core network is operable to inform the node server of whether to enable or not a certain type of Wi-Fi connection.

Preferably, the mobile data connection to the global network is capable of offloading to a Wi-Fi.

Preferably, the system further includes a profiling and recommendation module, wherein the module is operable to inform the user of a web resource or data plan at a predetermined time, based on information extracted from at least one of the social networking service platform and the MNO.

Preferably, a bot is operable to send a message to the user to inform the web resource or data plan, wherein the message contains a button or a link to initiate a purchase of the web resource or data plan.

Preferably, a prepaid wallet or MNO airtime credit from the user's MNO account or third party's MNO account is used for the purchase.

Preferably, the node server is operable to create a unique code to identify which payment request is to be paid, wherein the unique code is included in at least one of an affirmation message, an index and a unique string appended to a shortcode that sends the payment request.

Preferably, the module is operable to charge differently based on the users' ability on payment and a network's capacity on available bandwidth.

Preferably, the web resources are classified based on a characteristic of the web resources, and some web resources which are determined as non-time sensitive are stored on the local cache.

Preferably, the web resources determined as non-time sensitive comprise at least one of the following: video content, education-related content and information content.

Preferably, the local cache is operable to store web resources based on a combination of a request by a user and a request by the artificial intelligence engine and/or the machine learning engine.

Preferably, the web resources are gathered using a predictive and crowd sourced cache-ing technique.

Preferably, the node server is configured to connect to one or more router through the local or the global network, to share a bandwidth of the node server.

Preferably, the node server comprises a blockchain module converting the shared bandwidth into a compensation for a user.

Preferably, the server database is part of a core network of an MNO.

Preferably, the node server is operable to communicate with the core network of the MNO.

Preferably, the switch comprises at least one of a switch server and a logical switch.

Preferably, the node server is operable to determine a minimum allowable speed of a data connection of a user's device and allow one or more functions among a plurality of functions to operate on the user's device and to offer no more than a certain speed of the data connection.

Preferably, when a plurality of users use same contents at the same time in a same cluster or in nearby clusters, the node server and devices of the plurality of users are operable to contribute portions of the contents to distribute a burden of delivering traffic.

Preferably, other node servers and other users' devices are further operable to help in delivering the contents.

Preferably, when the users are idle, the node server is operable to perform regular cycles of disconnection and reconnection to allow timely notification alerts or time-sensitive data.

Preferably, in a case of users in which there is no connection to users' devices, the node server is operable to perform a non-cycling disconnection.

In accordance with another aspect of the disclosure or invention, there is a node server for use in a backhaul of a wired or wireless communication system to provide and manage a web resource, the node server comprises: an intelligent and purpose-built router, capable of granular traffic shaping on a per user or per device basis; a local cache for storing web resources, a logical switch configured to switch a provision of the web resource between a first mode and a second mode; wherein the node server is connectable to at least one of a local and a global network; and wherein in the first mode the node server retrieves a web resource from the local cache; and in the second mode the node server retrieves a web resource from the at least one of the local and the global network.

Preferably, the logical switch is further configured to switch the provision of the web resource to a third mode, wherein in the third mode the node server retrieves each corresponding web resource from both a server database and the global network.

BRIEF DESCRIPTION OF DRAWINGS

The present invention will now be described, by way of example only, with reference to the accompanying drawings, in which.

Figure 1:
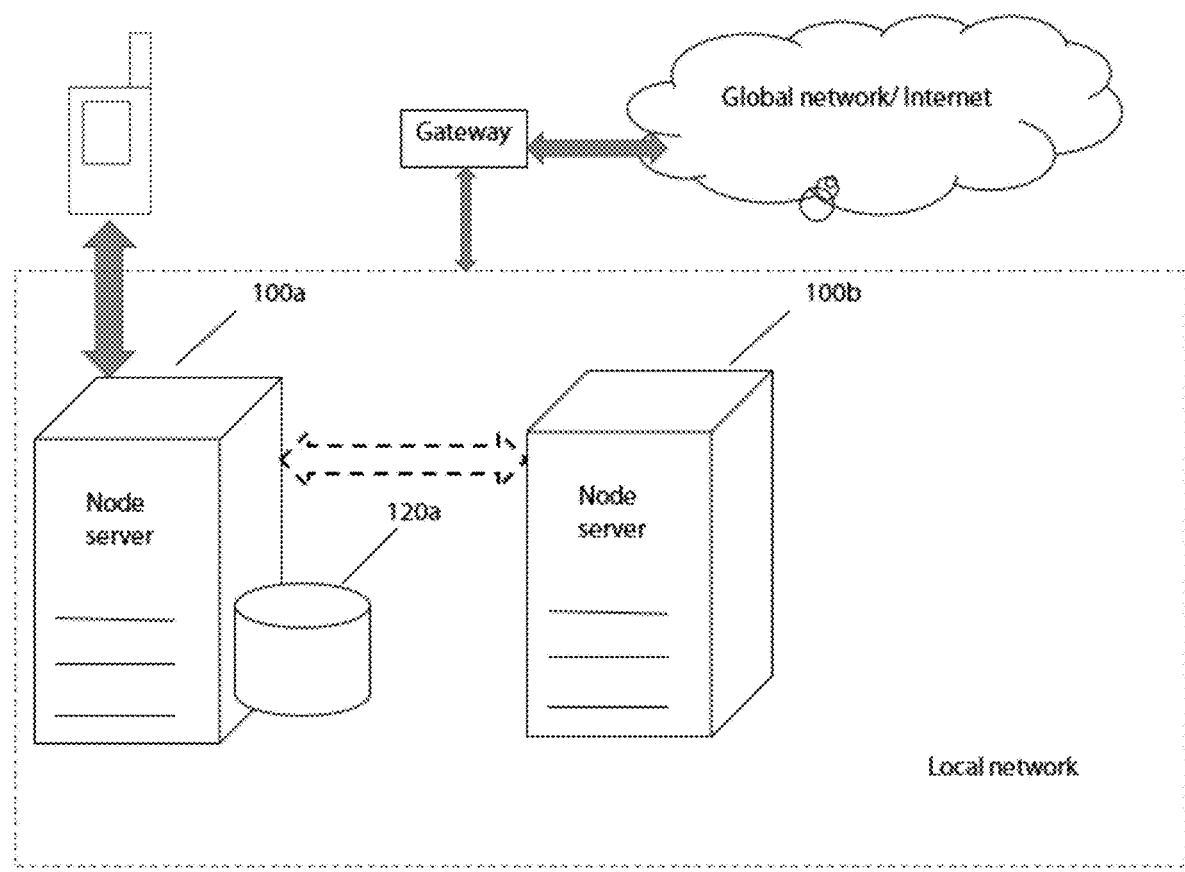
FIG. 1 illustrates an example of an embodiment of the system in accordance with an embodiment of the invention.

Other arrangements of the invention are possible and, consequently, the accompanying drawing is not to be understood as superseding the generality of the preceding description of the invention.

EMBODIMENTS OF THE INVENTION

The invention is motivated by an observation of how a selected geographical group of people access web resource via the Internet. Excluding Facebook™, it was observed that most of the contents delivered or provided to a user are not time-sensitive, e.g. video media platform such as Youtube™

DIY, All-time favorite videos, primarily textual contents such as that by Wikipedia™, etc.

While some may classify OTT (Over the Top) communications as that requiring real-time connectivity, a closer look at the user behaviour reveals a disproportionately greater time spent on texting versus video or voice communications—both of which may be real-time. Thus, texting (even with pictures attached) requires relatively miniscule bandwidth as compared to the video communications, e.g. Facetime™ conversation. So for practical purposes, texting can be served to a great number of users on limited bandwidth.

In this regard, there exists a need to develop a connectivity strategy in which non-time-sensitive and purposeful contents (e.g. Wikipedia™, news, education-related information) ought to be cached or stored in a local cache of a server and delivered as close to the end user as possible, meanwhile keeping essential or basic Internet services that need to be delivered in real-time, or as close to real-time as possible.

The essential or basic Internet services include communications that require narrow band or classified as urgent. By prioritizing the essential or basic Internet services while delaying or outrightly blocking bandwidth hogs like OS (Operating System) updates, cloud-base storage synchronizing, high resolution pictures, it is possible to serve users on a restricted backhaul bandwidth, e.g. as small as 50 Mbps, while providing reliable provision of the purposeful contents to the users to some extent.

In some embodiments, the intranet-served contents with the Internet-served contents may be combined and provided or delivered to the users, with a target Wi-Fi™ usage ratio consisting of the most locally cached contents within a local server (also referred to as a node server), and the rest allowed to reach the cloud for OTT texting, surfing on mostly static but useful sites (facts and news), and authentication services as that required by web sites, e.g. Google™ and Facebook™. For example, the ratio of locally cached contents may be greater than 80%.

It is observed that modern computers, e.g. Intel™'s barebones Next Unit of Computing (NUC) with the following specs: Intel™ i5 processor, 8-16 GB of RAM, and 2-4 TB of hard drive memory and running on an efficient Linux™-based OS, can host voluminous educational contents, such as a snapshot of the entire Wikipedia™ a great deal of Ted™ talks video, and most of what people watch on Youtube™ on real-time Internet delivered to hundreds of concurrent users. Hereinafter, these computers are referred to as micro-servers or node servers. It should be appreciated that these computers are not limited to the above examples.

It is observed that a synchronization of the contents from the cloud and the gateway micro-servers can work fine if the speed is 30-50 Mbps. It is also observed that 30 Mbps is enough to synchronize the contents from one micro-server to another micro-server.

In some embodiments, in order to deliver quality connectivity and contents to users, it should be appreciated that the following criteria are to be met:
  (a) Deliver connectivity of the intranet and Internet efficiently (e.g. approximately with cloud speeds anywhere between 30-100 Mbps) for an entire town (e.g. population of up to 5,000) using a technology such as the following: edge computing or edge cache-ing, distributed computing, traffic shaping (e.g. data stream or data packet monitoring and the control of such), mesh networking at the backhaul level and for last mile purposes (Wi-Fi™), among others.
  (b) Choose strategically the backhaul options, involving a site selection and an actual installation of a radio equipment such as access points and/or wireless nodes, a choice of base stations and CPEs (Customer-Premises Equipments) for bridging, a selection and a mix of frequency bands (e.g. the backhaul to run on the sub-giga spectrum) for range, power efficiency and ability to operate in an NLOS (Non-Line of Sight) environment, for a proper synchronizing or relaying of the contents, server to server, street to street, and clusters (e.g. towns) to the main servers residing in the cloud or a nearby carrier grade data centre.
  (c) Seamlessly mix the cached contents with a real-time connection to the World Wide Web access. Discovery of the semi-manually or completely algorithmically curated contents, with the objective of enhancing the users' experience to result in the targeted time spent ratio (e.g. 80%) on cached contents (e.g. for reading, listening and watching) and the re-discovery of those once the users choose to venture out to the larger World Wide Web. Achieving the latter is more challenging technologically since non-intrusive and non-annoying means which inform the users on "why" and "how to" are used.
  (d) Related to (c), a programming code with the aid of deep learning analytics, machine learning or AI (Artificial Intelligence) for use in the curation of contents is deemed relevant or desired by the users. Hence, the contents in one area may differ from contents in another area especially when different demographics are targeted and target areas are separated by long distances.
  (e) Enforce, in real-time, a dynamic access and contents filtering policy, for example distinguishing between apps (applications) and activities allowed or prioritized to access the cloud versus those throttled or blocked entirely; when the inventors talk about prioritized access, they tend to mean allowing faster access versus a slow one or getting contents at a later time. In some embodiments, where cloud access is throttled or blocked, the node servers may choose to offer cached contents substitutes which do not tax the backhaul connection.
  (f) Enable communications or delivery and sharing of the contents when the cloud connection may not even exist, using the micro-servers, acting as "Pony Express" nodes for relaying information where conventional network coverage is not reliable or available (e.g. Life Messenger™)
  (g) Comply with globally accepted standards on protecting users' privacy.

A Basic Free Wi-Fi™ Plan of the System

For the users on the free Wi-Fi™ plan, the users may get the following:
  (a) Throttled Internet described in the section below "Just enough Internet"—that is good enough for smooth surfing of the Internet via a browser
  (b) The system may block advertisements (e.g. in HD or video advertisements) that may consume bandwidth.
  (c) High speed access to various contents (e.g. video, music, Wikipedia™, Ted™ talks, Podcast™, e-book) stored on the micro-servers (for local cache access).
  (d) One or more OTT services, such as Facebook™ messenger and Whatsapp™. It is observed that when the users connect to a Wi-Fi™ service, the OTT messaging ranks high; they still want their smartphones to be able to do OTT communications and be alerted when messages come through.

(e) Possibly access to another version of the social networking platform which does not consume much bandwidth, e.g. Facebook™ Lite or Facebook™ Zero.

(f) Access to peer-to-peer messaging services (e.g. Life Messenger™) that can function with minimal Internet or even zero cloud connection. Apart from the social aspects of messaging via the Life Messenger™, it is observed that this is an important tool for first responders in communicating among themselves and with people to be rescued when cell towers go down.

Network Architecture

FIG. 1 illustrates an example of an embodiment of the system in accordance with an embodiment of the invention. As shown in FIG. 1, the system comprises one or more micro-servers 100a, 100b (also referred to as "node servers"). The micro-servers 100a, 100b are connectable to at least one of a local and a global network.

The micro servers 100a, 100b are configured to store a plurality of web resource usage profiles associated with one or more users. In some embodiments, the micro-servers 100a, 100b may include a local cache 120a. It should be appreciated that the local cache 120a stores the web resources.

Although not shown, a switch server or a local switch may be arranged in a signal communication with the micro-servers 100a, 100b and be configured to switch the provision of the web resource between a first mode and a second mode. In the first mode one of the micro-servers 100a, 100b, e.g. a first micro-server 110a, retrieves a web resource from the local cache 120a. In the second mode the first micro-server 110a retrieves a web resource from the at least one of the local and the global network.

It should be appreciated that the first micro-server 110a may connect to the global network directly. It should also be appreciated that the first micro-server 110a may connect to the global network via other one or more micro-servers (referred to as "gateway micro-server").

Figure 2:
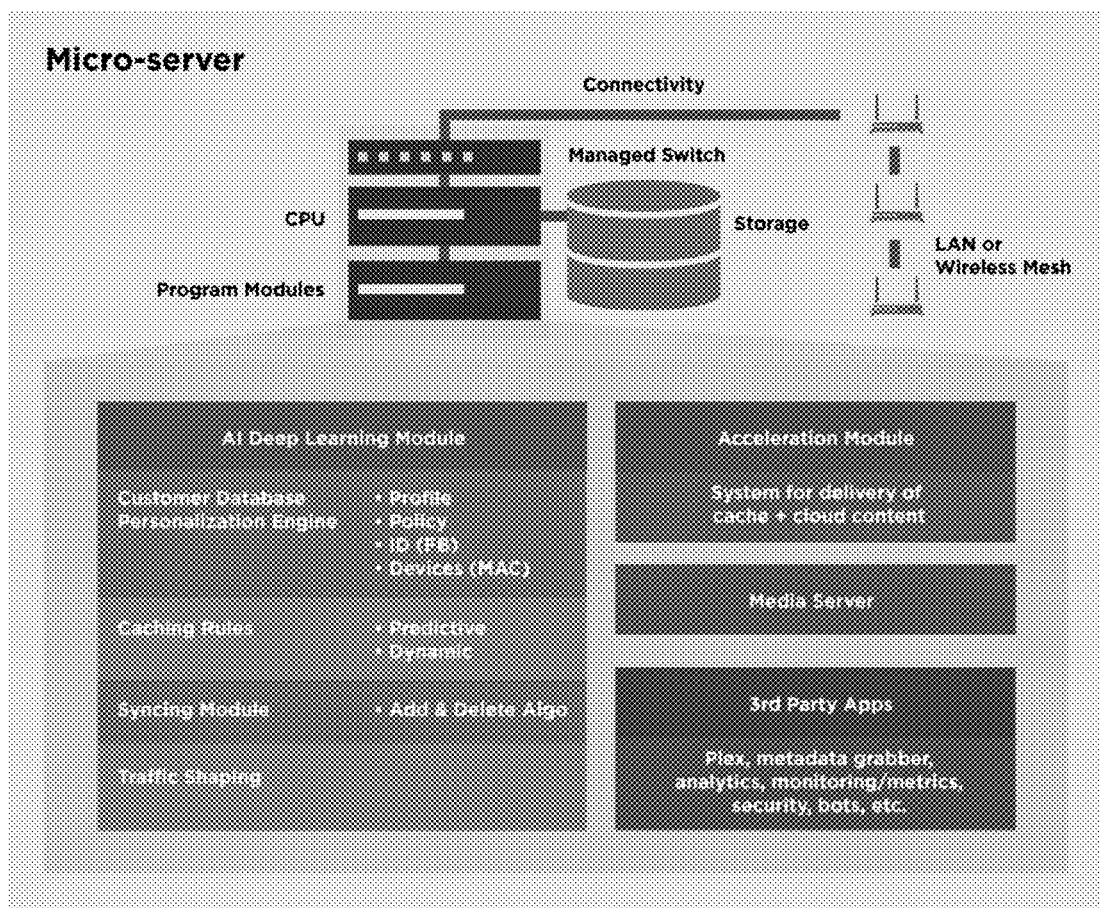
FIG. 2 illustrates an example of the micro-server in accordance with an embodiment of the invention.
Figure 3:
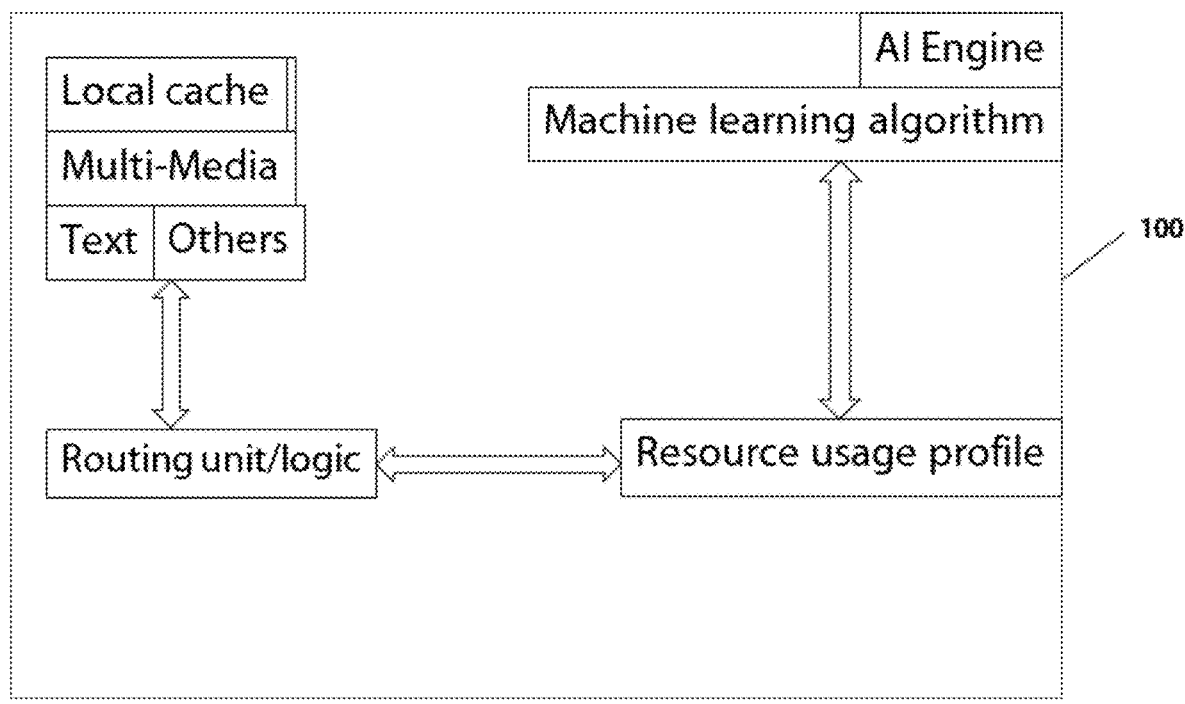
FIG. 3 illustrates a block diagram showing the micro-server in accordance with an embodiment of the invention.

FIG. 2 illustrates an example of the micro-server in accordance with an embodiment of the invention. FIG. 3 illustrates a block diagram showing the micro-server in accordance with an embodiment of the invention. The system in accordance with the invention comprises the at least one micro-server. The micro-server is configured to retrieve the web resource from a local cache, or from a local and/or global network.

As mentioned above, the micro-servers and the Wi-Fi™ access points close to the users within a Wi-Fi™ range are provided. Each of the micro-servers is capable of hosting concurrent users, for example one hundred (100) concurrent users. As an example, for capacity planning purposes, a ratio of one active user per five registered users in a target area is assumed (hereinafter referred to as a "cluster"). Therefore, a micro-server can potentially host up to five hundred (500) registered users.

The micro-server 100 comprises one or more the following elements:

(a) Highly intelligent and purpose-built router, capable of granular traffic shaping on per user or per device basis; The router knows when to access data stored in its local cache, when to reach out to other micro-servers nearby (e.g. including intranet messages), and finally when to permit the access to the cloud, and that which will run through the relatively limited backhaul.

(b) A media server for videos, photos, audios/podcasts, regularly updated mix of media and textual contents (e.g., Wikipedia™, Ted™ talks), educational media and textual materials, and simple text and media messages kept in its local cache;

(c) Algorithms and programs that enable the relay and exchange of the information with other micro-servers and the synchronization of the contents with other micro-servers nearby; the micro-server is also able to mash up the contents stored locally and the contents sourced from the cloud. Using its intelligent routing and traffic shaping capabilities mentioned in (a), the micro-server does so in a least intrusive way, through the seamless substitution of local copies in place of cloud-sourced ones; the micro-server communicate with the users via app notifications and popular messengers. This in contrast to the conventional products using annoying pop up portals that distract the users in the middle of doing something and intrusive text messages which are furthermore not supported in certain gadgets, e.g., laptops, Chromebooks, Kindle™, and iPad™

(d) An AI or Deep Learning engine that is able to analyse a bunch of data locally, including consumer behaviour, to better serve or recommend contents deemed relevant by the users, and help the traffic shaping mentioned in (a) and (b);

(e) A storage device, typically an internal or external ruggedized hard drive, for example with a capacity of no less than 4 TB.

Taking a geographical area as an example, a cluster may consist of a few contiguous residential blocks, covering anywhere from fifty (50) to one hundred (100) mixes of single detached homes and low rise multi-dwelling units. In some embodiments, a cluster could be one hundred (100) meter street consisting of commercial establishments such as restaurants, bars, and retail shops.

Figure 4:
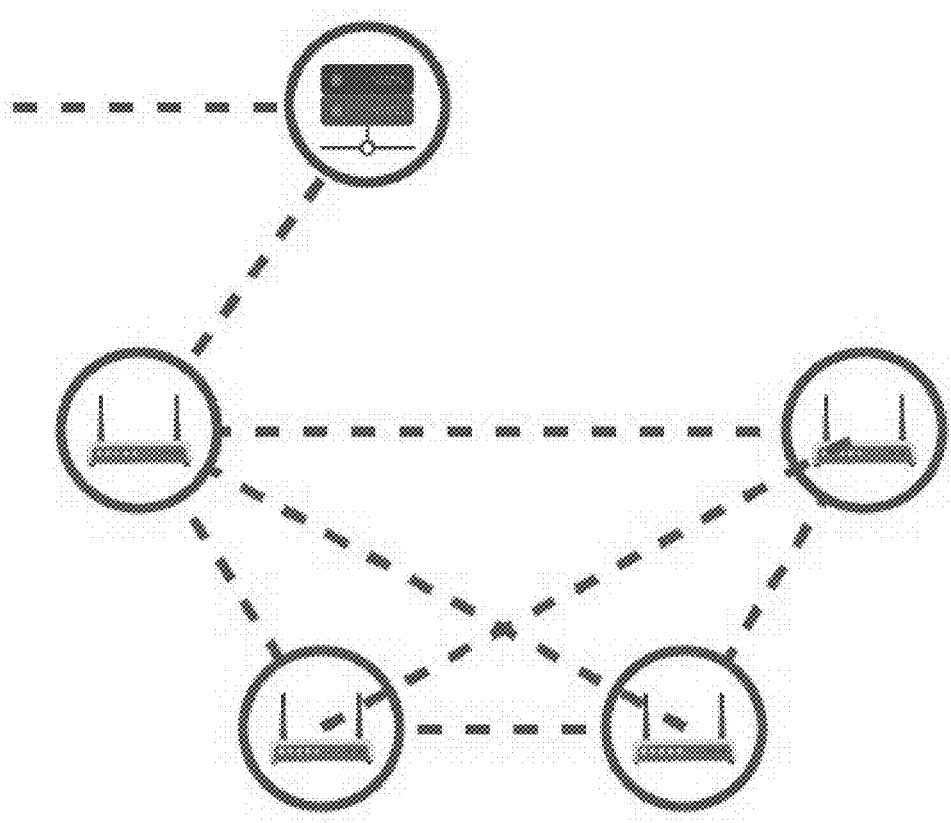
FIG. 4 illustrates an example of a cluster with one micro-server and powering up Wi-Fi™ access points connected in mesh-like fashion.
Figure 5:
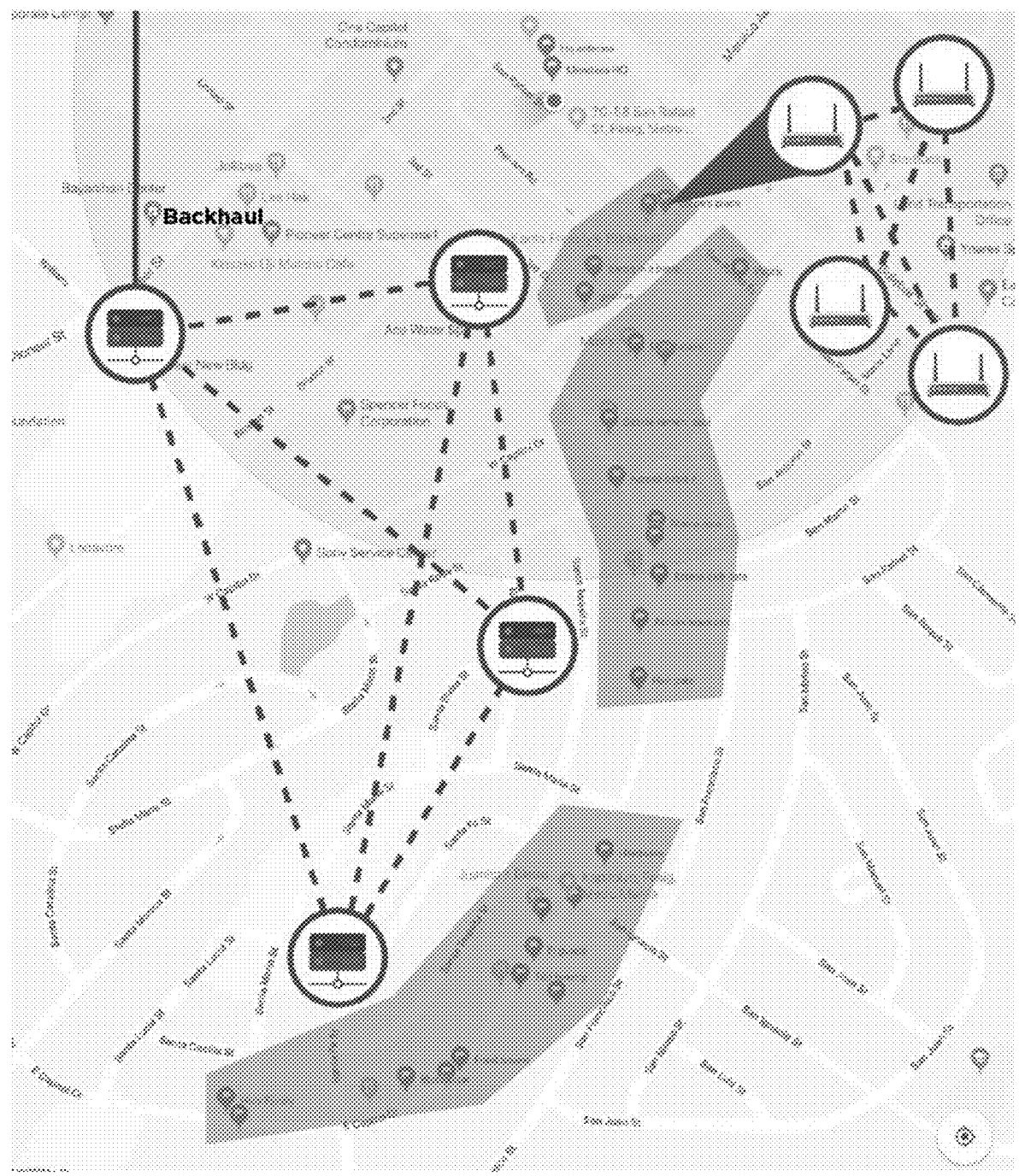
FIG. 5 illustrates an example of the actual deployment of a cluster of clusters in a particular county, with one micro-server acting as WAN, cloud and/or virtual LAN (vLAN) gateway.

FIG. 4 illustrates an example of a cluster with one micro-server and powering up Wi-Fi™ access points connected in mesh-like fashion. FIG. 5 illustrates an example of the actual deployment of a cluster of clusters in a particular county, with one micro-server acting as WAN, cloud and/or virtual LAN (vLAN) gateway.

The Wi-Fi™ access points are placed strategically around such clusters. The use of the access points may be mixed with high-gain omnidirectional or directional antennas. The omnidirectional antennas are placed in areas where density is of a primary concern and theft is unlikely to be done. For example, these access points are placed at a height of about 12-15 feet from the street level. Mesh-capable access points are placed within one or two other perimeters. The access points with directional antennas are used when the range is desired or when the risk of the theft or tampering is of a concern. For example, these access points are installed at about 25 feet from the street level.

All the access points in the cluster are linked up wirelessly (hereinafter referred to as "a mesh fashion") or wired to a micro-server.

The micro-servers communicate wirelessly with other micro-servers in the mesh fashion, as well, to improve the uptime. If one micro-server goes down and hence it is unable to relay information from another connected micro-servers to the micro-server, the network heals itself by looking for available micro-servers that can restore connectivity. Between the micro-servers, a speed of 30-50 Mbps per a connection may be achieved. Such connection between the micro-servers is used primarily to synchronize the media contents. In some embodiments, for synchronizing contents, open source peer-to-peer programs such as BitTorrent™

Sync and/or Syncthing™ may be used. A certain portion of the micro-server connection is also allocated for real-time cloud access. In some embodiments, in giving direct cloud access per user, traffic shaping algorithms are employed. The traffic shaping algorithms may prioritize the essentials while throttling or outrightly blocking traffic that can prohibit or could choke the limited backhaul.

The micro-server and numerous access points make up a cluster. In some embodiments, the micro-servers may communicate with each other through wireless bridges. In another embodiment, the micro-servers are wired using Ethernet cables or even data-over-power means. The micro-server may be capable of accessing the cloud directly (also referred to as gateway micro-servers) or use other micro-servers to reach the cloud.

Consistent with the objective of reaching remote areas with limited backhaul speeds, it is preferable to maximize the number of the micro-servers which are able to link up to the gateway micro-server. The contents of the gateway micro-server need to be refreshed and updated. The rest synchronizes in a peer-to-peer fashion without a need to access the cloud directly.

A grouping of nearby clusters may be referred to as a peer-to-peer Wide Area Network (P2P WAN).

The network architecture may be extrapolated. The micro-servers in a P2P WAN can connect directly or indirectly through other micro-servers to central macro base stations that are co-located with more powerful servers, massive storage devices and/or more powerful CPUs that can perform heavier analytics for traffic shaping and customer profiling, and equipped with directional antennas installed at high altitudes for Line-of-Sight connectivity with the P2P WANs, the gateway micro-servers within the clusters or even CPEs at the residential or establishment level.

Some embodiments for the wireless bridges that connect one micro-server to another micro-server consist of wireless nodes that operate in the mesh fashion and on sub-GHz frequencies. It enables an improved uptime, better load balancing, and ability to continue serving the users even in harsh environments and challenging terrains. The embodiments of the sub-GHz frequencies are driven in a large part of the strategy of a quick deployment at the street level and with minimum power requirements, e.g. even the use of solar to power access points and wireless bridges. The transmission at sub-GHz frequencies is better at dealing with obstacles and is said to have better NLOS (Non-line of Sight) properties than those that run at higher frequencies such as Wi-Fi™, e.g. on 2.4 GHz and 5.8 GHz. For example, the transmission on the TV UHF (Ultra high frequency) bands such as that on 600 MHz are better able to penetrate trees, plants, structures consisting of concrete, glass, wood and steel (e.g. houses, buildings, office environment). At the street pole heights, there may be many obstacles along the path of the micro-server to micro-server communication.

The communication between the micro-servers is primarily used to synchronize contents propagating in P2P in a torrent-like fashion with other micro-servers in the P2P WAN, and to relay the real-time cloud data, OTT messages, Facebook™ Logins, and so on.

Managing Concurrent Connections to the Access Points in High Density Situations

The typical Wi-Fi™ access point is capable of connecting up to 150 concurrent users. In areas with unusually dense foot traffic of the users, one approach to provide quality connection is by adding more Wi-Fi™ access points and other known methods such as Band Steering (from 2.4 Ghz to the less crowded 5.8 Ghz band).

There is also another way to manage a sudden surge in concurrent connections since the Wi-Fi™ access points are intended mostly for providing connectivity to people in public, outdoor, and highly mobile environment. The micro-server's router function has an ability to take note of the users connected but are relatively idle or may have moved to another location due to loss of connectivity, compared to other users presently engaged in using the connection to communicate, surf, or consume multimedia contents. In the case of the latter, in which the users are idle, the micro-server may perform regular cycles of disconnection and reconnection, the frequency of which aided by at least one of an artificial intelligence and a machine learning algorithm, to allow the timely collection of notification alerts and other time-sensitive data such as messages sent via OTT. In the case of users in which there is no connection to the their devices, the micro-server may perform a non-cycling disconnection, sometimes referred to as the "lease time" before a particular gadget's local (wLan) IP address can be released and offered to another user's device.

The router has a predefined lease time for all its users. In the case of the micro-server's router function, the lease time per user and per IP address would vary, for example in length from as short as 15 minutes to the more typical 12 hours, depending on the type of the users it is connected to, nomadic versus relatively stationary. This process on varying lease time on per user and per device basis is aided by at least one of an artificial Intelligence and a machine learning algorithm.

Network Architecture and Self-Contained Cluster of Clusters, Capable of Operating Even if Cut from WAN The micro-servers and the overall network architecture are designed so that, even if they are cut from WAN of the Internet, they still would be able to perform certain critical functions, such as serving cached contents stored in the micro-server and nearby ones, permitting messaging and group exchange of information within the cluster or the connected group of cluster(s).

A Special Case Using Another Invention of the Pony Express

The micro-servers are capable of acting as super transponders or beacons for the Life Messenger™ and/or Pony Express system. The micro-servers can retrieve and relay the payloads faster through Wi-Fi™, versus Bluetooth™ Low Energy. Further, the micro-servers are able to store more data playloads, process them faster, upload and synchronize them with far micro-servers or with cloud-connected servers, and relay data payloads to other far micro-servers, beyond the range of the traditional Wi-Fi™ or other wireless communication protocol/means as known, such as microwave, satellite communication, for example.

Even in a situation in which the networks are completely cut off from the Internet or other clusters on the P2P WAN, messages and data can be transmitted among the users on the cut-off network. When the network connects again to the larger WAN, the messages and data meant for users there or the cloud-based servers are processed and sent faster from the micro-servers that have picked up data from the users, e.g. Life Messenger™ users. It is noted though that the Life Messenger™ advertises or broadcasts itself in the local network such as LAN, clusters, or cluster of clusters.

Data Traffic Identification

It should be appreciated that an ability to identify with a high level of accuracy what the user is trying to do may be crucial to the objective of delivering the quality connectivity while making a great efficient use of the backhaul cloud connectivity.

Examples in which the technique is employed are as follows:
  (a) Identifying who the user is, i.e. the smartphone or gadget he is using, and determining what services he is trying to access whether via an app or a browser. The app may be installed on the smartphone or gadget to retrieve the necessary information, e.g. in background, and what the user is accessing or surfing.
  (b) Knowing when to deliver locally stored contents via the edge servers or when to give the user access to the World Wide Web. Automatically toggling between an Intranet mode and an Internet mode based on the behaviour of the user.
  (c) Related to (b) and in the case of accessing unsupported or deprioritized cloud-based services, when to inform the user of the policy and what the user can do, and possibly redirect the user to a service or contents that may act as a substitute albeit housed in the edge servers. This may be in line with a delivery of purposeful Internet.
  Push messages and/or notification to the user where the contents are not available, not permitted, or not supported. An inferior substitute to the communications via notifications and OTT messaging may be to use SMS.

Just Enough Internet for a Smartphone to Work

The modern phone, e.g. smartphone, requires at least some speed of Internet connections to function properly. Without the speed, the phone and many of the apps being run may fail to function properly.

When a particular service requires third party login services such as Facebook™ Login or Google™ OAuth, basic connectivity is necessary. Notifications inform the users that something is up and that they may act on those. Other examples include apps that require an access to accurate Internet time (e.g. Network Time Protocol, "NTP"), apps that require the user to share his location (e.g. latitude and longitude information). The system allows casual surfing, OTT textual messaging or multimedia messaging containing low resolution media, access to GPS and location services, such as Waze™ navigation, synchronizing contacts and calendar entries to the cloud, feedback to apps that need to regularly update their cloud-based servers of certain information, such as whether their apps are up and running, where their users are (e.g. friend finder type services, find my phone services), the general health of the smartphones on which their apps are running, and so on and so forth—all these necessary for the smooth functioning of the modern smartphone. These constant pinging and accessing of servers and other clients via the cloud, taken in aggregate, means that a certain minimum speed of connection is necessary.

In some embodiments, the speed may be set to anywhere from 64 to 256 kbps. For example, if a CIR (Committed Information Rate) is 128 kbps, the user is able to perform a basic surfing, though it is not as fast as the unthrottled LTE connection. For another example, if the speed of the access is pulled down to as slow as 64 kbps, the phone's basic functions, such as notifications and/or OTT messaging with minimal media exchange, would work. The type of device and user also determine the speeds that the servers may allocate to each user. For example, a high end iPhone™, running more apps and performing constant security checks as compared to an entry level Android™ phone, would necessarily require a higher minimum speed of connectivity to the Internet, as that for a user that has more, on average, apps running concurrently.

First Time Access to the Wi-Fi™ Service, Registration, and User Identification

In some embodiments, a database of the registered users are maintained. The extent and speed are maintained by which the users can access contents or site on the World Wide Web through the Wi-Fi™ network.

To initiate a connection, the user may select a particular wireless network identifier such as an SSID (Service Set Identifier) from a number of others that would show up when the user scans for Wi-Fi™ hotspots. Once the SSID is selected, an alert in the form of a captive portal, a pop-up page, or a Home browser page explains the terms of the connection, and the user may agree by clicking "Yes" to proceed.

Captive portals, e.g. in the form of pop-up screen, are however a hit and miss game, especially with lower end handsets. Upon connecting to an SSID, the captive portals sometimes do not show up promptly, sometimes not at all. In the case of a delayed pop up screen, users have a tendency to click the "Home" button or switch to an app or turn on the browser. When users do this, but have not yet agreed to the terms and conditions of the Wi-Fi™ access, the users shall not be permitted to make use of the Wi-Fi™ connection. This can get confusing or frustrating for the users unable to gain entry. The more sophisticated users would know that they may perform a "Forget Network" on the SSID.

So, in conjunction with the captive portals, the system may also offer a direct connect and a browser based "Agree to the terms and conditions" and "Yes" type of buttons.

For example, in a market with postpaid users, the MNOs who host the public Wi-Fi™ network may know who the users are and whether their monthly plans allow them access to these hotspots. In some embodiments, the users may explicitly agree to the terms of Wi-Fi™ access by clicking on a "Yes" button as a one-time process. Henceforth, the connectivity is assured whenever the users go near their MNOs' access points. Authentication systems may employ an Extensible Authentication Protocol (EAP).

In another example, in a market with mostly prepaid users, say, in a developing country like the Philippines, the MNO who hosts the public Wi-Fi™ may not know who the users are, since a registration process such as presenting a valid ID may not be required to activate a SIM (a mobile service). In some embodiments, the users need to purchase SIM cards and top it up smartphones using a dialing keypad or its text messaging facility.

With regards to a first time Wi-Fi™ access, the activation may be through a captive portal that is displayed upon a selection of a particular SSID. The user may click "Agree" to the terms specified. At this point, the host Wi-Fi™ provider, e.g. MNO, captures data specific to the user's gadget such as a MAC address. Some providers go further by requiring the user to enter his mobile number for an identification and an authentication. A text with a unique code may be entered by the user to allow the access. In this regard, the MNOs may provide the better quality access to the users who are also subscribers to their mobile services.

The prepaid method mentioned suffers from several problems compared to the seamless means (hereinafter referred to as EAP-SIM) which performs its task of offloading data traffic from LTE to the MNO's Wi-Fi™ network. One problem of the prepaid method is the use of texting to authenticate and identify since a mobile number associated with a particular user could cease in a short period. Another problem of the prepaid method is in relying on texting that can be inherently unreliable. For example, these texts may be delayed or not sent at all. Further, the prepaid method does not apply to gadgets that cannot initiate or receive text messages such as an iPad™, a laptop or a Chromebook. Another problem of the prepaid method is that most public Wi-Fi™ providers, e.g. MNOs, make it optional for the user to identify himself due to the added friction and the reluctance to release personal information. Hence, the MNO is left with a user ID consisting only of one's mobile phone number.

The EAP-SIM method employed in postpaid system also present certain challenges and deficiencies. One such is that EAP-SIM systems are expensive to deploy and hard to implement in the prepaid markets in which the typical MNOs do not require the users to identify themselves.

In some embodiments, the approach to first-time registration and authentication may overcome the above-mentioned problems. For the approach, it may be needed to ask the user to perform certain actions on a social network account, e.g. Facebook™ account, to give the system public profile data as well as his ID.

As an example, the user may message a software application that runs automated tasks over the Internet (hereinafter referred to as "bot") using a messenger, and after reading the terms and conditions of Wi-Fi™ access. For example, the bot operates on a social networking service platform, e.g. Facebook™. As another example, a user may perform an action ranging from liking a page and/or sharing that page, to the more typical act of giving permission for a third party to access one's basic Facebook™ information.

One such more superior process to authentication may be performed as follows: the user clicks a link on a page—browser or pop up page—that explains the terms and conditions of Wi-Fi™ access, and that link has been uniquely created for a particular device and that directs the user to a bot that resides on a messenger, to which the bot replies with a welcome message containing a short introduction of the Wi-Fi™ service, and/or another clickable URL which when the user affirms his agreement to the further terms of access, takes him to the more standard Facebook™ Login, asking an access to the user's Facebook™ public profile and certain non-public information such as the user's birthday, friend list, liked pages, hometown, gender, etc. In another embodiment of what constitutes an agreement to the Wi-Fi™ terms of access, the user may perform certain social network type of activity such as liking a particular page. This in itself may be used for registration purposes. It should be appreciated that as an incentive to register through the methods described above, the Facebook™ app, though not part of the basic offering, may be given full access to the Internet for a predetermined period, e.g. one week.

In some embodiments, since the user's Facebook™ ID may be used for the registration while not allowing a full access to Facebook™, the system, through DPI (Deep Packet Inspection) and data pattern recognition methods, can distinguish the different types of encrypted traffic (e.g. Secure Sockets Layer (SSL)) being accessed from Facebook™, for example the Facebook™ Login facility, accessing the messenger service to reach the bot, and/or other social networking functions.

Although an example of using Facebook™ is described, it should be appreciated that other encrypted Internet services may be used. It should also be appreciated that the system may allow certain types of the encrypted traffic to pass through while not allowing to the others. It is to be noted that a database containing a matching of unique data stream patterns and matching them to specific web resources in a service cloaked in SSL may be kept and updated regularly, through manual or algorithmic means.

The inventors also note that these challenges and the use of sophisticated analytics is not required in dealing with unencrypted Internet traffic.

A distinction is to be made between the systems and processes described above to dealing with encrypted data traffic and those offered by off-the-shelf DPI solution providers, whether they are software-based such as nDPI (open-source high-speed DPI) or hardware-based such as that which can be enabled in Cisco Meraki™ switches. While the traffic shaping policies, e.g. whitelisting, blacklisting, and throttling, are performed at a high-level application layer (Level 7, for example), e.g. Facebook™ App, Facebook.com, the system may take a deeper look to identify the type of data traffic, whether it is intended for Facebook™ Login, accessing a bot through the Facebook™ messenger, streaming of specific videos on Facebook™ or Youtube™, etc.

Granular traffic shaping to permit access to social networking service resources for the registration process (a) The user may select the Wi-Fi™ SSID. Wi-Fi™ passphrase may not be required. Once a device, e.g. smartphone or client device, connects to the network, the system may record the MAC address of the device. The system may check if the device has already been registered on the system or if this is the first time to access the network. In the former case, the system may further check if it is the same user on the device using the user's Facebook™ ID which the system is allowed to inspect. If so, then the user may access the network with whatever an access policy the system have defined for the user. In the case of latter, the system proceed with a next step of identifying the user and binding the MAC address to the user.

(b) To identify and authenticate the users, the system may rely on the user's IDs that are kept in the cloud and are relatively static or changed very rarely. The system may use the user's Facebook™ account. It should be appreciated that the system may use another social networking services' accounts such as the user's Google™ or Twitter™ account.

(c) The social networking service may be chosen based on at least one of the following: pervasiveness, static nature, and the accessibility to the deep user profiles.

(d) The system may not permit an access to the major social networking features through the app or webpage. It should be appreciated that limited versions of the social networking service may be used. For example, since Facebook™ may require a real-time access to the cloud and consume much bandwidth, Facebook™ Lite or Facebook™ Zero may be used.

(e) Since Facebook™ runs on the SSL, the system may identify particular SSL traffic meant for the messenger service and Facebook™ Login. The system may use both for the registration and for building the user profile database. Also, for the post-registration, the system may use Facebook™'s messenger service to communicate with the users on matters relevant to the Wi-Fi™ service. Any pattern of packets that resembles a Facebook™ Login (referred to as a 'signature' or 'fingerprint') is identified and the system, the servers of the invention, decides whether the data packet is to be accepted or dropped.

(f) To overcome the challenge of allowing the access to the Facebook™ messenger service with the bot and Facebook™ Login resources without opening access to the entire social networking service, the system may operate as follows:

a. The system may need one or more tools to gain visibility of data packets running through the network. One of the tools may be a program referred to as Wireshark™.
b. The system may monitor unique data patterns of the user using Facebook™ Login and/or the Facebook™ messenger service. Wireshark™ allows the system to associate the unique data patterns to either the Facebook™ Login or the Facebook™ messenger service.
c. With enough snapshots of the unique data patterns that occur before the Facebook™ Login or the Facebook™ messenger service traffic takes place, the system may therefore know with a high degree of accuracy whether in fact the Facebook™ Login or the Facebook™ messenger resource is being accessed, and hence, the system may allow the SSL packets to pass through.

(g) The process described in (f) above may be a manual process of identifying and allowing or blocking the SSL traffic. However, this process may be automated since the data patterns may not be static for a long time. In particular, the system may create an own firewall to process all the data packets to identify the Facebook™ Login or the Facebook™ messenger activity.

(h) The process described in (f) and (g) above may apply to another social networking services or suite of Internet services such as that offered by Google™ using their Google™ OAuth login process, or through Youtube™ and watching a particular video on Youtube™, e.g. advertisement, and so on.

(i) It should be appreciated that at this point the system has already identified the unique Facebook™ user through a unique ID that Facebook™ assigns to its users, whether globally or specific to an app.

(j) Again, the data patterns may not be static, and therefore, the server may continuously check if data patterns are still true, as described in (g). Using machine learning techniques that monitor trends and aberrant behaviour, i.e. sudden drop in registrations, the timing of when the system may perform the checks and adjust the program accordingly may be more efficient and accurate.

Thus, the system is able to allow sessions on otherwise encrypted traffic required for the proper functioning of the system, and to block traffic that is considered as unnecessary and that can potentially clog the limited backhaul.

It should be appreciated that the above illustrations described in (g) to (j) may apply to other encrypted SSL sessions such as that by Google™, Twitter™, Instagram™, Snapchat™, etc.

The monitoring of the unencrypted sessions is pretty straightforward using the tools less sophisticated than Wireshark™. For example, media sharing via torrents is unencrypted and therefore is easily identified by the data packet inspection tools and can be immediately blocked by the system.

As mentioned above, Facebook™ has started giving unique IDs on a per app basis versus system-wide, network-wide. When the system may need to identify the same Facebook™ user in another application, workarounds can be applied to get the true unique ID across all the applications. There may be many elements on the Facebook™ profile page or in the Facebook™ app that still provide the unique ID. The unique ID may be searched and verified.

Binding a Smartphone to a User and Creating a Means for Communicating with the Users Even if in an encrypted (SSL) session, the system may not only allow the session to take place but also identify the user's unique ID, e.g. unique Facebook™ ID for the app, Google™ email address, and Google™ basic profile information. A process for tagging a particular electronic communications device such as a smartphone to a user is as follows:

(a) Most public Wi-Fi™ services allow the device to display a captive portal that explains terms of access and/or their policies which the user may first agree to the same by clicking an "Agree" button.

(b) In the case, the "Agree" button may relate to a unique URL that the system has created specifically for the device (e.g. MAC address).

(c) Once clicked, the unique URL takes the user to a specific Facebook™ messenger chat thread to meet the Wi-Fi™ bot.

(d) The Wi-Fi™ Facebook™ messenger bot may welcome the user to the public Wi-Fi™ network and explain main goals of the Public Wi-Fi™ service (e.g. "affordable Internet for all") and various services. For example, the Wi-Fi™ bot may promote its various services which may include at least one of the following: educational materials, current events and/or news stored in the local servers, and/or readable, downloadable, or playable contents. In this way, the Wi-Fi™ bot may promote its various services that are located on the local servers versus that need access to the cloud and consume the backhaul bandwidth.

(e) As described above, the name that the user registered with Facebook™ along with the MAC address now binds the user's smartphone. As mentioned above, it is noted that recently Facebook™ has changed their policies towards issuing out UIDs. The UIDs differ per third party app developers. For the purposes of the invention, this does not make the invention any less potent. The point is as follows: now the system in accordance with the invention knows if it is the same user, with the same credentials on the system. Also, since the system has extended an interaction with a Facebook™ user via the messenger and/or bot engine, likely the system may capture the user's true UID within Facebook™.)

(f) To follow up on (e) above, various loopholes may exist, e.g. allow the system to ID the Facebook™ user even with Facebook™'s recent change. Many elements in the user's Facebook™ such the user's profile picture, the same visible to any app across the board can help identify the same person across apps. Systems exist to determine with a high level of accuracy if a particular photo is the same seen by another app. One can attach image hashing algorithms based on a photo. It is expected that there are other elements in the social networking service that can serve the same or similar purposes.

(g) It should be appreciated that the social networking service, e.g. Facebook™ or Twitter™, account may be used, since an ID of the social networking service account is static compared to an email address or a prepaid mobile number. It just does not make sense to rebuild the user's social network from scratch, and make it likewise difficult for the user's friends to keep track, revalidate, and re-accept.

(h) Through the messenger bot, the system may communicate to the users regarding information pertinent to the service, such as when the user's free connection time is up, why the system blocks the user's file sharing function, and whether the full functionality of the Facebook™ app requires a premium or paid access.

(i) As a traditional means, Wi-Fi™ operators communicate with the users. The Wi-Fi™ operators allow the user's device to display pop-ups of the captive portals, and the pop-ups may annoy and interrupt the users. The Wi-Fi™ operators may also send text messages which are expensive, intrusive, unreliable, and do not apply to devices that do not have an SMS facility, e.g. iPad™). Other public Wi-Fi™ operators may make use of an app specifically created for a purpose of an access, but the users are not inclined to download the app for the purpose of the access only.

(j) The bot on the Facebook™ messenger is a simpler, more convenient, and acceptable way to communicate with the users. The bot may send a messenger message which is displayed as a notification that can be swiped down, read and replied to without having to switch from an another app executed in foreground to the messenger app. After the user reads and possibly replies to the bot message, the dimmed app re-emerges without an interruption to what the user was doing. The bot is also capable of natural language conversation. For example, the user may ask relevant questions such as "Why am I unable to watch Youtube™ videos?" The bot may explain that it is a premium service that requires a payment, and further inform on how to purchase.

To gain greater access to the user's Facebook™ information, an explicit dialogue may be inserted before (c) above. The dialogue may be for asking the user if the user allows the servers to access to certain non-public information from the user's account using the same unique URL used in (c) above. Then, upon agreeing, the Facebook™ messenger may be accessed to the user in order for the user to meet the bot.

It should be appreciated that there are other means of communicating via notifications and/or other OTT messenger apps. These notifications may be displayed via browsers and/or computers.

Registration and Subsequent Identifying of Users Based on Facial Recognition and Similar Means The system may not give access to a device per se, rather to the user with the device(s). Hence, it should be appreciated that the choice of Facebook™ or Instagram™ is driven in large part by these social networking services pervasiveness and the static nature by which the users maintain their accounts. Emerging technologies, in which the inventors are working with, likewise have attributes making them ideal for user identification purposes.

Facial recognition driven by more efficient machine learning algorithms and purpose-built hardware have made real-time (or almost real-time) facial recognition possible. One such hardware allows the concurrent identification of up to two thousand facial images. High definition cameras may be used to recognize and tag the users. This would make logging on to the Wi-Fi™ network and authentication faster and more convenient. In this regard, the fingerprint recognition and the facial recognition may make the authentication and logging on to various apps easier.

The process is as follows:

(a) The system goes through many of the steps described in the above section of "Binding a smartphone to a user and creating a means for communicating with the users".

(b) After the step (d) of the section above of "Binding a smartphone to a user and creating a means for communicating with the users", the system may ask the user if the user would like to enable the facial recognition to be enabled for the Wi-Fi™ login and the authentication purposes. If the user agrees, the system may ask the user to stand in front of a camera situated in proximity to the Wi-Fi™ access point and stay there until the flashing red LED goes from long flashes to rapid flashes, then ends—signifying that the system has successfully recorded the user's face.

(c) The Facebook™ messenger bot may talk to the user and ask to confirm that this photo of a person's face is indeed the user. Once the user confirms, then the system may match the facial signature of the user to the user's Facebook™ ID and possibly the MAC address of the gadget.

(d) As a further security measure, it is noted the user's location based on the Wi-Fi™ access point that the user is connected to, and the camera recording. Since the system may now have an access to the user's Facebook™ account, the system may perform scrape through photos on the user's Facebook™ to further ascertain that the picture the system took of the user is the same person the system tagged to a particular Facebook™ account.

One advantage of the facial signature is that for all intents and purposes, the system has recorded an even more static ID/signature of the user, more immutable than a Facebook™ account. The Facebook™ account is static, could be modified and deactivated. The user's facial signature is static. Further, with the rapid advancement in machine learning hardware and techniques, the user's facial signature can be recognized with a high degree of accuracy, even if the user ages or puts on eyeglasses, for example.

The user can switch devices and continue on with Wi-Fi™ access to the network by simply glancing at the cameras, and confirming that it is the user trying to gain access. The confirmation can be done via browser, the bot messenger, and/or Facebook™ notification, among others.

Another advantage of the facial signature is that it becomes easier to perform the machine learning analytics on the user without an explicit login to the Wi-Fi™ access points. The cameras do the task of identifying and recording various data, such as movement and/or motion of a person, to further improve the delivery of the services.

Towards a More Intelligent, Relevant Media Cache-Ing Strategy Crowd Sourced with Deep-Learning Analytics It is impractical for the system to put all the videos on the edge or on the micro-server cache. The methodology for building relevant videos that the users want to see or music that the users want to hear combines crowd-sourcing and deep learning analytics. An algorithm is as follows:

(a) Initially, the top videos, e.g. one thousand (1,000) videos, most viewed on a particular video streaming site and the top songs, e.g. one hundred (100) songs, most listened to on a music streaming service may be selected. These media by itself may be enough to get the users to consume the contents randomly, even without search.

(b) As time goes by, the users would click on media that are not yet on the edge servers. To the extent that the system has an available bandwidth to deliver, an access from the cloud may be allowed. Through the aid of deep learning analytics, the system is able to do the followings: recommend media that users with the same viewing patterns have exhibited, with bias towards media on the micro-server storage; and source contents that are most likely to appeal to particular subsets of the users. It should be appreciated that much of the contents are chosen to cache ahead of time.

(c) At some point the hard drives reach a threshold, e.g. 80% of its storage capacity, by which time the system needs to start being more selective in the contents cached and deleted. For example, this can be done in a straightforward algorithmic fashion using parameters such as popularity, number of likes, and how recent the contents have been uploaded. It should be appreciated that the above methodology may be coupled with the deep learning and predictive analytics.

(d) Even if varying demographics lead to differences in the contents stored on the micro-servers, it should be appreciated that that it is not as dramatic from micro-server to micro-server and/or county to county. As such, it is not expected that the cloud and/or cluster-to-cluster bandwidth will be used much for tailor fitting contents to target users in proximity.

(e) In another iteration of the crowd-sourcing process for cache-ing of contents, the system may keep tabs of how many times a particular video or song has been requested by the users in the same area. When a certain number of requests have been achieved, the system may cache and push to the edge server and then to the micro-servers.

(f) There are peaks and troughs in bandwidth use throughout, for example a given day. When there is an excess capacity, the system is more likely to give direct streaming access from the cloud and ratchet up the cache-ing of the contents which are most likely to be watched by the users. On the other hand, when the system may approach the maximum of what the bandwidth can handle, the system may choose to defer the viewing of the contents, e.g. video, (not yet on cache) and recommend similar contents that have been cached. The system may choose to explain why this is being done, through the messenger bot, for example, "Sorry, but we cannot play this title at this time. Please feel free to choose from the following." For example, the system may further inform, through the messenger bot, that "When we are able to make this video available, we shall inform you right away. Thank you for your understanding and your support of our primary mission to inform and educate."

On-Demand Video Application, Such as Youtube™

It is observed that more than 80% of users watch Youtube™ if unlimited, fast enough (e.g. greater than 500 kbps) Internet is given. Youtube™ is an inherently cacheable library. Trending videos are not only made known but also can be predicted. The challenge however is that Youtube™ is delivered mostly encrypted, via SSL. The users may need to sign on the Google™ accounts when the users navigate through the service. In this regard, it would be difficult to see what the users are viewing and liking, once the users are signed in. Hence, in some embodiments, the system may intercept packets exchanged with Youtube™ and check for data stream patterns using tools like Wireshark™ and match these patterns to the URL of specific videos.

In Youtube™, there are settings to control the types of videos that are allowed for the user to view, e.g. Youtube™ for Schools, Can Approve Videos. This is a way to control the backhaul bandwidth used by Youtube™—for the essentials, e.g. Youtube™ for Schools, Youtube™ for Teachers. Since Youtube™ allows certain users, e.g. bot, with the power to approve videos, in some embodiments, the system may have a full visibility of the requested particular videos which the system may consider making part of the cache. In another embodiment, the system may see the requested particular videos, since to the system may need to approve the viewing of the videos manually. In this way, the system may know who has selected the videos. In some embodiments, it should be appreciated that the system utilises the bot powered by the deep learning analytics and AI to make a decision, for delivering worthwhile videos and videos which are most likely on the cache.

The system is able to learn the users' media consumption behaviour. The knowledge or patterns can be applied in curating and delivering contents from other sources including media services.

Giving the Users an Access to Particular Youtube™ Videos without the Need for Youtube™ to Give Full Access and/or Privileges It should be appreciated that the embodiments can be applied in many other situations in which the access to a specific item, site, page, contents and/or media are allowed, in an SSL connection.

When "signed in" to Youtube™, the exchange of information between a client and a server is done via the SSL connection. The SSL connection may include many web-based services. A methodology for controlling the data traffic and access in an SSL connection is described below.

A process to promote certain videos when viewing of Youtube™ is not permitted is as follows:

(a) There are URLs of specific videos that the system allows the users to view, stream and/or offline view. Then through the use of Wireshark™ the system may record the data packet patterns when the specific videos are being accessed. A database may be created.

(b) Through a website or an app the system may show a collection of Youtube™ videos permitted. The messenger bot may also inform interesting videos that the user may wish to view on Youtube™. By each video, a link and/or button may be displayed, with containing the links described in (a) above.

(c) When any of the URLs described in (a) above is pressed, the system with Wireshark™ may be alerted and check to see if the data packet pattern is the same as that the system recorded in (b) above. If so, the system may allow the video to be viewed. If not, the system may inform the fact to the user.

When the embodiments described in this section are combined with the embodiments described in the above section of "On-demand Video such as Youtube™", the combined system (hereinafter referred to as "Youtube™ Accelerator") may create a collection of videos incrementally.

Bandwidth Efficiency, Mashup of Cached and Cloud Accessed Contents, and Browser Redirection A Squid™ proxy server may perform a task of cache-ing popular contents so that when accessed by others, the system may not need to obtain the same contents from the cloud, in order to preserve the backhaul bandwidth. The system may employ an algorithm, AI and machine learning-enabled, to identify the contents to be cached ahead of time and to whom to recommend such. The Squid™ proxy server, however, may not peek through the SSL connection. The trend towards the SSL-ing of web traffic will only expand with time, though. (Where applicable and without breaching terms of access by the service providers, the system in accordance with the invention can employ the technique described above for the curation of Youtube™ videos.)

Hence, to achieve the target cached consumption, e.g. 80%, the system may need to sharpen the machine learning tools and crowdsourcing methodology in guessing and predicting what the user is trying to do or what the user is accessing in the cloud. The system may need to be more selective in choosing the contents that the system store or caches on the micro-servers. The system may select and present the contents, e.g. videos, to the users through a browser navigated site or a partner app maker. The system may have some degree of control in selecting the contents shown on their party app. The combination of crowdsourcing algorithms, machine learning analytics, and sophisticated customer profiling methods may boost the ability to achieve the target cached consumption, e.g. 80%.

The system may also allow an access to the contents which are not yet cached and would not use much bandwidth. In some embodiments, it should be appreciated that the system may allow the few times access before the cache-ing takes over, even if the contents are heavy. Furthermore, for browser surfing, the system may block heavy advertisements.

There are situations in which it is difficult to serve the requested contents due to its penalty on bandwidth, since the serving of the request contents would exceed the CIR (Committed Information Rate) allocated to the particular user, and/or the requested traffic can potentially choke the intra-network (e.g. AP to consumer, micro-server to micro-server wireless bridge connections) and the backhaul connection to the World Wide Web or the cloud.

To manage the expectations of the users, when confronted with these types of situations, the system may use notifications, e.g. the bot in accordance with the invention sends a Facebook™ messenger message informing users that the system cannot fulfill their requests. The system may recommend another contents which are similar and provide another contents as substitutes, by pointing or redirecting another contents to an app or a website. The app or the website present the recommended contents which have been cached on the servers. The recommended contents either have been stored on the edge server, i.e. at the micro-servers or media servers, using the wireless bridges that yet have ample bandwidth. These distant contents and proxy servers contain a much larger library that can be pushed to the edge micro-servers, without need to fetch them in real-time from the World Wide Web.

Youtube™ Accelerator and the DIY Version

The Youtube™ Accelerator, e.g. 4 TB hard drive, may be a computer or contents delivery system, and store and regularly update videos in the 4 TB hard drive. The Youtube™ Accelerator may be capable of grabbing contents via the Internet or through broadcast satellite. The contents, e.g. video, may be likely to be viewed by particular users in a target area. The Youtube™ Accelerator may communicate with the Youtube™ app. If the Youtube™ app sends a notice that a video being accessed already resides in the Youtube™ Accelerator, the video may be served from the Youtube™ Accelerator versus having to get from the cloud.

As described above, the Youtube™ Accelerator may deliver Youtube™ contents to the users without much penalty on the backhaul and last mile bandwidth. The process below describes a DIY version of a Youtube™ Accelerator system:

(a) As described above, the system may be capable of identifying videos being accessed by the users even in an SSL pipe. Again, the system targets an 80-20 ratio of locally consumed (or cached contents) to contents taken from the cloud. This however may not be the case in the beginning, when the system is still building up the video portfolio. Hence, the system may allow video contents streamed from the cloud to the extent that the last mile and backhaul bandwidth allows the system to do so.

(b) The system may apply Youtube™ restricted modes, e.g. Youtube™ for Schools and Youtube™ for Teachers, "Strict Restricted", "Can Approve" access modes, to kick off the system's library of purposeful contents. In the case of "Can Approve" mode, videos being requested not yet permitted, the system may log, approve (via bot), and allow to be streamed and be considered for cache-ing.

(c) To further conserve bandwidth, when a Youtube™ video via the Youtube™ app or a browser is requested, the system may ask Youtube™ to deliver an HD (High Definition) stream, e.g. 1080p and 4K, but as soon as the system detects that the streaming has begun, the system may throttle down the speed of the user to the minimum speed prescribed by Youtube™. This method works by accelerating the delivery of SD (Standard Definition) or low resolution contents, because Youtube™ has prioritized or accelerated the delivery of the video at speeds meant for HD videos.

(d) When the system may be alerted that a particular video is being requested and the video has already been put on the cache, the system may shut an access to Youtube™ and redirect to an app that has the video on cache. A third party Youtube™ viewer app may also provide the Youtube™ videos. Video streaming then begins. This is described in the above section of "Giving the users an access to particular Youtube™ videos without the need for Youtube™ to give full access and/or privileges".

(e) Access to the collection of videos (again not necessarily confined to Youtube™ contents) can be done via an app or a website, consisting of a collection of customized URLs, curated and the result of data mining by the AI and machine learning modules.

Detection of a User Trying to Access to Contents that Cannot be Delivered at the Speed Allocated for the Free Service or that the System Explicitly Prohibits without a Premium Plan The system may know when the users are struggling to access to the contents that cannot be delivered through the pipes at a particular time, or that the system expressly prohibits even if such traffic is running through the SSL.

In some embodiments, when a refresh button of a browser is repeatedly pressed or when an app is repeatedly swiped down to refresh, the system may detect that the app is trying to initiate new connections or sessions with particular servers in abnormally rapid sequence. In another embodiments, the system may detect by tracking the logs of throttled or rejected packets that the user sends out. If the packet count reaches a certain threshold, the system may detect that the user is trying to access to something that the allocated bandwidth cannot handle. Then the system may proceed through the notifications, alternative recommendations, and redirect process described above. It should be appreciated that the system may be used with the AI and/or machine learning to improve the accuracy.

A True Wi-Fi™ Offloading Scheme for the Prepaid Markets without EA-SIM

The poor quality of connectivity experienced by mobile users in some developing countries has a lot to do with the overselling of capacity by the developing countries' MNOs over the years, most of whom did not anticipate the explosion of social network use, exponential rise in user generated contents activity (e.g. Youtube™) and the dramatic adoption of Spotify™ for on-demand music and Netflix™ for video— versus DVD rentals and ala carte selling of music and videos by the likes of Apple™'s iTunes™.

A conventional approach to better indoor coverage, e.g. malls in which 40-60% of users spending traffic goes through (in the Philippines) is to put massive base station cellular sites facing the structures. However, this approach is expensive and does not really work since covering high traffic areas is more a density issue rather than range or ability to penetrate these structures.

The Wi-Fi™ solution takes into consideration the prospect of offering MNOs the ability to offload data traffic from scarce 3G/4G/LTE capacity to Wi-Fi™ hotspots placed indoors and in places with very high foot traffic. For the reasons explained earlier, the economics of using Wi-Fi™ versus mobile Internet is compelling from users' point of view. Further, it is also compelling for the MNO since the cost of serving the same type of quality connection costs via Wi-Fi™ is a fraction of the cost of delivery via 3G/4G/LTE.

The challenge is that in a predominantly prepaid market, the system for the seamless transfer of 3G/4G/LTE traffic to Wi-Fi™ hotspots, similar to how the EA-SIM method does it, may not have been developed yet by the MNO equipment vendors. Further, an EA-SIM system is an expensive proposition, requiring the replacement of millions of SIMs already out there. Further, the EA-SIM system was developed with the postpaid market in mind, in which the real-time accounting of usage—in terms of say, volume measured in MBs, is not crucial.

In some embodiments, the system may sell the Internet on an app per app basis (referred to as bite sizing of the Internet), running 24×7, versus time-based bite-sized plans (e.g. on a per 15 minutes basis), which is not how smartphones were envisioned to connect to the Internet. The bite-sizing based on a short-time was then fine with laptops connecting in "dial up" fashion, but not for smartphones that were designed for all-day OTT communications and notification of important traffic.

In this regard, the system may implement the Wi-Fi™ offloading that mirrors the user's active prepaid plan with an MNO. For example, the plan may be Facebook™ plus Whatsapp™ only. The system for Wi-Fi™ offloading is described as follows:

(a) The users with active data plans (3G/4G/LTE) with MNOs may be the ones to be given the Wi-Fi™ offload access. The system may upsell them a paid 3G/4G/LTE plan, and thereby earn a commission.

(b) As a user of the MNO is near the Wi-Fi™ zone, the user either tries to connect automatically if the user has done so in the past or the user chooses the SSID if this is a first time to access the Wi-Fi™ network.

(c) The system may utilize a method to retrieve the user's mobile number (e.g. SMS verification, MIN insertion, social media mobile account information, etc.) and bind the mobile number to the MAC address of the user's device.

(d) The system may check if the user has an active mobile data plan with the user's host MNO. Since the user may have an active mobile data plan to begin with, the system can tap into the MNO's core network directly or indirectly to see if the user is eligible for Wi-Fi™ offloading on the system and what type of access the user should get, e.g. full Internet access or only for specific apps. Having done so, the MNO's server asks the Wi-Fi™ system server to give access of offloading data traffic.

(e) The notable approach to the way Wi-Fi™ offloading is performed in using the active 3G/4G/LTE plan of the smartphone to provide a feedback or loop back mechanism to talk to the MNO's server and then relay information to the micro-servers that manage access to the Wi-Fi™ network.

(f) There would be situations in which the user's active mobile data plan does not permit outside access beyond certain apps, e.g. Facebook™. In this situations, the system may create a proxy or indirect connection to the MNO's core network through the apps hosted by Facebook™, for example.

(g) It is noted that the system identifies the users primarily through the user's Facebook™ ID. In the example of how the system provides the Wi-Fi™ access, the system maps the MAC addresses to Facebook™ IDs. In an analogous manner, the system may do the same in terms of matching a Facebook™ ID to a smartphone's IMEI or an MNO's IMSI (SIM card). There would be a situation in which the MNO may wish to tokenize the user's ID by not giving the system the access directly to their IMSI or MIN (mobile phone number). This is fine for as long as the tokenization technique is unique on a per IMSI basis. The system may do the same, as well—tokenize the user's identity—not revealing directly the user's Facebook™ ID and the user's particulars as this is not allowed by Facebook™ without express permission of the user. However, it should be appreciated that the system profile of a user obtained through Wi-Fi™ usage behaviour, Facebook™ data and activity made available to the system, if combined with MNO usage data, will dramatically improve the system's and the MNO's understanding of the user's habits, from use of the Internet and consumer behavior—that may be used to provide a better overall customer experience on both the system's Wi-Fi™ network and the MNO cellular service.

(h) If the user has no active mobile data plan, the system may not allow the Wi-Fi™ offloading. If the user tries to connect to the Wi-Fi™ network, the user may receive a message informing of "not connected" and the reasons. The system may upsell the Wi-Fi™ connection services or data plans by the MNO. In this situation, it is important that the user tells the system with which MNO service he subscribes and that he tells us his mobile number via the bot messenger or a captive portal or a home browser—that is, if he has not done so.

(i) In the case in which the user has an active mobile data plan, the system may mirror the active mobile data plan on the Wi-Fi™ network. For example, if the user has a Facebook™ plus Instagram™ plan that has a couple of hours more to go, the system may give the same access or similar access. Another example will be a volume-based plan, e.g. 100 MB with 50 MB left, for three days by the MNO. The system can offer the same, e.g. 50 MB, to the user, counted or not counted towards the user's volume allocation. The system or the MNO may agree to give the user unrestricted and non-volume capped access to the Internet.

Premium Contents and Access Such as Real-Time Cloud Connectivity for Apps, and how to Accept a Payment Currently the basic public Wi-Fi™ service is free. This service consists of OTT messaging (e.g. prioritized Whatsapp™ or Facebook™ messenger), Facebook™ Lite, Facebook™ Zero, basic surfing, contents delivered from the micro-server storage, webmail, notification, and cloud connectivity throttled to at least some speed of Internet connections, as described in the above section of "Just enough Internet."

The system may cover the operating expenses of the free Wi-Fi™ service. The system may have features consisting of at least one of the following: full Facebook™ access, more Apps allowed to run and access to the cloud at faster rates, movie and TV contents, and overall higher cloud connectivity speeds, e.g. greater than 2 Mbps.

The system may profile the users and understand proper recommendations, e.g. contents or data plan, for the users. The profiling and recommendation module of the system is backed up by the AI and/or deep learning analytics platform. The module, through the bot and redirection to the store website, informs the users of contents or data plans at a time when the users are most likely to purchase. For example, the module may use a knowledge of common paydays and the type of notification received, e.g. tagged on a picture. The information may be extracted from Facebook™ or other social media platform.

Further, the system may make it convenient for the users to make purchases. It should be appreciated that payment may come from prepaid wallets or through the use of MNO airtime, but the payment method is not limited to the above.

Some of tools and/or methods the system uses are as follows:
 (a) Data traffic identification aided by the machine learning may be used to inform the system when the users are trying to access to deprioritized or restricted contents or simply looking to increase the connection to the cloud.
 (b) AI, machine learning, and/or big data analytics using crowd-sourced data may be used to better understand the desires and pain points of the users. The tools may run at the core of the personalization and recommendation engine.
 (c) The OTT messaging may be used to communicate with the users to explain what is happening and to upsell relevant services. The messages may recommend things that the users might like, such as faster access to the World Wide Web, the whitelisting of restricted apps and/or prioritizing the traffic used by those. The messages may contain a clickable button or a link which if pressed initiates the purchase process. In this regard, the users may know that their time for the Internet access is up and may check options to purchase more time on the Internet.
 (d) Allowing app notifications to come through, even if the notifications come from the apps that are not included or deprioritized in the basic free offering. An example would be notifications that one has been tagged on a photo posted on Facebook™. Thus the user is more likely to purchase a plan that gives full Facebook™ access at that point in time.
 (e) In some situations, the target market may consist of MNO's prepaid users who do not have credit cards or electronic wallets. In this case, the system may use MNO airtime credits as currency for the users' purchases. Many telecommunications carriers and/or MNOs have adopted a scheme for converting the airtime credits earned by contents providers through revenue sharing schemes. Currently some MNOs host APIs (Application Programming Interfaces) that allow payments in the form of airtime credits which they convert to cash to be paid periodically (e.g. monthly) to the contents providers.
 (f) The airtime credits payment scheme differs from others in that the system may allow a third party to pay for someone's purchase. The third party may then settle among themselves. In many cases, the system have observed that the same user owns both the gadget with the MNO SIM card containing enough airtime credits balance and the other device, e.g. a smartphone or even a gadget that do not hold a SIM card that the user may wish to give connection. In some embodiments, it may not be required that the recipient of the airtime credits has a SIM card or an account with an MNO. In some embodiments, it may be required that the system knows that someone has paid for the premium access willingly.
 (g) The first iteration payment process for doing (f) goes as follows:
  a. The user with an iPad™ is tagged on a Facebook™ video and receives a notification. The user clicks the notification, and then is directed to the post on the user's Facebook™ app.
  b. The user tries to play the video. However, there may be situations that the CIR (Committed Information Rate) is not enough to play the video. A rotating arrow showing buffering is displayed. There may be another situations that the system has explicitly prohibited Facebook™ videos from being streamed to a device connected on a free service basis.
  c. The system is alerted of the situations using a detection technique for knowing when someone, i.e. the user, is trying to access to the service which is not supported on the free service basis.
  d. The Facebook™ messenger bot may inform the user that, for example "We think you are trying to play a video on Facebook™. Unfortunately, this is not possible on the free Wi-Fi™ service. May we suggest full Facebook™ access for P5.00 for the next 24 hours?" It should be appreciated that an acceptance button, e.g. "Yes, Sure" button, may be contained in the message.
  e. The user clicks on the "Yes, Sure" button. The Bot replies that, for example "How would you like to pay for this?" It should be appreciated that some options are presented such that "With my own load" and "Using another account" options.
  f. Clicking "With my own load" option initiates another message from the bot such that "P5.00 will be deducted from your Load which has a balance of P95. Press "Agree" button to continue. If the user selects "Agree" button, airtime credits of P5.00 are deducted from the user's MNO account. If the system does not know the user's mobile number, the system may ask for the mobile number and verify the same.
  g. If the "Use another account" option is selected, the bot replies that, for example "Please enter the mobile number of the account which you wish to debit P5.00." The user enters a mobile number, which could be either by another MNO account that the user owns or by a third party, e.g. another person, willing to pay instead of the user.
  h. Further to (g) above, the user enters the mobile number via the bot or website. A text message is sent to that mobile number, such that "Are you willing to pay P5.00 for the Wi-Fi™ connection of <NAME>? Please reply Y/N." To aid in identifying the transaction being paid for, especially in the case of someone making business out of using his airtime to earn a margin on the amount charged, the system in accordance with the invention can use at least one of the following techniques:

(i) The system appends a series of numbers, unique per transaction, to the short code, to which the payer mat reply "Y" or "N."
(ii) The system asks the payer to include a unique 4 digit code in the message having "Y" or "N."
(iii) The system simply says that one must respond to the message within 60 seconds or thereabouts.
i. Further to (h) above, if a reply of "Y" or "Yes" is received, the system charges the account of the third party's account, and informs the user that the host has agreed and that the user now has one full day of unlimited Facebook™ access.
(h) Even though the illustrations above relate to the Facebook™ access, it should be appreciated that the app is not limited to Facebook™ and there are many variations as follows: some apps, e.g. Snapchat™ and Instagram™, which are data plans on their own, an add-on to the basic service, full, unrestricted or unthrottled access to Youtube™, and faster access to the World Wide Web, e.g. greater than 5 Mbps.
(i) The MNO requires the actual SIM card inserted in the device to have the airtime credits to pay for the access. It is inconvenient, costly, and impractical to keep multiple wallets across devices. Also, if the gadget does not have a texting or calling feature, then the user will may pull out the SIM card from the device, insert it into a phone that can text and complete the purchase for the plan.
(j) As explained in the sections above, the system does not rely on text messages for authentication, registration, communication with the servers, and in provisioning the Wi-Fi™ access. The system also has the way of binding a particular smartphone with someone's account with an MNO as described in the Wi-Fi™ offloading method. The system is therefore capable of deducting airtime credits from one's MNO account even if the gadget that contains the SIM card has no texting facility, such as an iPad™ with postpaid monthly plan. This makes the payment system more convenient and real-time as described in (g) and (h). Charges can be made without the use of texting or calling. The provisioning of the Wi-Fi™ access is processed via a browser, a bot OTT message.

Other Tools that Help the Micro-Servers Such as Cloud-Managed Switches that Aid the Micro-Servers in Shaping and Identifying Traffic, e.g. Cisco Meraki™ Switches, is Capable of DPI and Maintain a Database on Data Signatures of Popular Apps A growing number of network gear manufacturers have begun offering equipment (e.g. managed switches) that employs DPI, traffic monitoring techniques, and/or high level traffic shaping, such as that on Layer 7 at the app level. Network administrators can then perform Content Filtering, e.g. whitelisting and blacklisting of apps and URLs, and throttling aggregate traffic (per cluster), on per user or per app and/or URL basis. The equipment manufacturers regularly update their database, for example, the IP ranges of specific URLs such as Facebook.com, Youtube.com, or the unique signatures that help identify SSL traffic.

The system may combine features of a Cisco Meraki™ switches with the more granular approach to data packet monitoring and traffic shaping. In this regard, the system is more granular compared to Cisco Meraki™ switches, since the Cisco Meraki™ switches can identify the traffic being used by the Facebook™ app overall, while the system can identify which part of the traffic is meant for the Facebook™ messenger versus the social network.

The Cisco Meraki™ switches, for example, may inform of the app trying to access to the cloud. The system may utilise the information to apply the more granular approach to traffic shaping and Content Filtering. In this regard, less CPU overhead for the micro-servers in identifying app-specific traffic and less work for the system's developers in keeping the app data signature database up-to-date are required.

Maximizing Revenues and Capacity Management

The system may charge differently based on the users' ability to pay for premium access, and when there is available bandwidth. The sales may be increased through the system that knows when a user is most likely to purchase a particular plan, e.g. unlimited Youtube™. The system, in particular a dynamic pricing system, may utilise the information of the user's price elasticity and the network's ability to handle an extra capacity with minimal penalty to overall network performance. The system may make use of the AI and/or machine learning that constantly refine the understanding of the users and the monitoring of available bandwidth per area and/or per cluster, through specific time windows.

Tactical Marketing Tools that Widen the Customer Base and Those in which Advertisers are Willing to Pay As described above, the system can monitor customer behaviour and selectively offer different types of access, from free to premium. Apart from being able to offer connectivity to the underserved markets, the system may use the tools to increase sales.

The system may use incentives (e.g. better or premium access) to shape the users' behaviour as follows:
(a) In some embodiments, the system may utilise a promotion tool using a social networking service. For example, the system may utilise a message of "Follow us on Instagram™ and you get free one day premium Facebook™ pass." Even though Instagram™ is not a part of the basic free offering, the system may employ the same techniques as what the system does for directing the user to a Facebook™ messenger bot or permitting only the viewing of specific Youtube™ videos. In this regard, the system may have an access to the user who follows on Instagram™
(b) In another embodiments, the system may utilise a promotion tool using contents. For example, the system may utilise a message of "View and share Sprite's latest reality video you on Youtube™, and get a 2 hour unrestricted Youtube™ pass." The techniques are described in the above example (a).
(c) In another embodiments, the system may utilise a promotion tool using contents based on location information. For example, the system may utilise a message of "Subscribe to Barangay Kapitolyo's Youtube™ Channel and get 2 mbps access for 1 whole day." The techniques are described in the above example (a).
(d) In another embodiments, the system may utilise a promotion tool using sharing of post. For example, the system may utilise a message of "Retweet this Post" or "Post a selfie with #iluvPinkberry and get a cup with three toppings of your choice free at Pinkberry™." It should be appreciated that the system may make use of the user's location information. The location information may be provided by the user and the system may access to the user's location. It should also be appreciated that the system may approximate the user's location through the access point to which the user is linked up.

(e) In another embodiments, the system may utilise a promotion tool using advertisement. For example, the system may utilise a message of "View Coke's new advertisement on Youtube™ and get premium access for one hour."

(f) In another embodiments, the system may utilise a promotion tool using store promotion. For example, the system may utilise a message of "Visit 3 Krispy Kreme branches and get a free six pack on the third!" The techniques are described in the above example (d).

(g) In another embodiments, the system may utilise a promotion of SIM card. For example, the system may utilise a message of "Buy a new Smart Prepaid SIM card and get 5 GB of Internet and unrestricted Wi-Fi™ at the Wi-Fi™ Hotspots". It should be appreciated that the system may use the technique described in the section of "A true Wi-Fi™ offloading scheme for the prepaid markets without EA-SIM" which enables the system to bind a smartphone to a SIM card and to a user through the user's Facebook™ ID.

Sharing the User's Internet Bandwidth to the Network, Incentives and Compensation, Possible Use of Blockchain Technology to Keep Ledgers of Points Earned In the areas the system may cover, there will be users/households privileged enough to have relatively fast or under utilised Internet access, through wired or wireless gateways. Sharing their connection with the network enables the system to increase the aggregate bandwidth the system can offer the users. The bandwidth can be used for synchronizing contents at the micro-servers and for giving real-time connectivity to the users. Though in the above section of "Network architecture", it should be appreciated that only one or few micro-servers may act as gateways to the cloud (or the central, larger servers). In another embodiments, it should be appreciated that any micro-server may be a gateway or a WAN point of entry.

To allow the users to share their Internet connection and get compensated for it, all the systems need to make a wired or wireless, e.g. Wi-Fi™, connection to their routers. The micro-servers are equipped with Wi-Fi™ facilities that can be used for backhaul purposes and multiple NICs (or LAN ports). The micro-servers are easily configured to treat connections to home routers as additional WAN gateways.

The system may use peer-to-peer sharing programs, such BitTorrent™ Sync or Syncthing™, to synchronize the contents across the micro-servers. Thus, a micro-server with multiple WAN access, through other gateway micro-servers and direct home router connections, can synchronize the contents faster and that of others. (By design peer-to-peer file sharing programs work faster the more peers able to "seed" to the network.)

To give incentives for home with fast WAN access, some embodiments include any combination of the following:

(a) A rewards system that earns them points which they can redeem in the form of premium access on the Wi-Fi™ networks deployed all over the country. These points they can also share or resell to other users using person-to-person electronic currency sharing programs.

(b) The system can pay them directly for use of their bandwidth, at costs, more competitive than how the system source ours. (The inventor draws an analogy of homes that install solar panels and sell excess electricity to the "grid" in the form of credits towards their monthly electric bill, except cash is used for payment.) Payment can be in the form of cash or electronic currency such as Bitcoins. The micro-server can be configured to help relay data for Bitcoin transaction purposes, or they themselves can be set up as Bitcoin "miners."

(c) Similar to how "miners" are compensated for helping affirm transactions and synchronized with blockchains for Bitcoins, the system can do similar for the rewards and point system as described in above (a). The blockchain technology shall keep track of bandwidth shared and the users who share through their routers. For illustrative purposes, the system measures bandwidth shared in terms of volume or megabytes, assuming that the system is able to meet the minimum speed that the system defines.

(d) The blockchain module, programmed in the micro-servers, also includes a system to convert bandwidth shared into points or "Coins" in blockchain parlance. It is noted that the blockchain technology is particularly suited for the public Wi-Fi™ system. For the most part the system may rely on distributed computing, the combined power of many, wherein the micro-servers are deployed in areas not within easy reach of fiber or copper. The system works faster and more efficiently when packed in proximity, helping each other.

The Wireless Network Acting as "Backhaul" for Those Who Wish to Get Better Indoor Coverage The choice of mesh capable wireless base stations and CPEs is meant to speed up and lower the cost of deployment without significantly compromising the reliability and speed of the connectivity.

There may be a scenario in which homes or commercial establishments decide to gain better indoor coverage. All that the system needs to do is to give them a Wi-Fi™ access point mesh-enabled and compatible with the mesh access points. The system can do away with structured cabling and go completely wireless for as long as the indoor access point is within reach (preferably line of sight) with one or more of the outdoor access points. There will be some loss of speed, but since the system has designed the access points to be all within one hop away from the micro-servers or a wired access point connected to the micro-servers, the system does not expect a significant degradation of the connection quality, at least not that the final end users would notice.

The extension access point benefits from the inherent load-balancing, self-adapting, and self-healing features common in mesh enabled wireless networks.

The un-structured cabling installation of the access point is done very quickly: the system simply defines the MAC address of the access point as part of the Wi-Fi™ network, a process sometimes referred to as "adopting" the access point. Plug it in.

In minutes, it will select the best outdoor access point to which it connects. When situations change, like that outdoor access point goes down or get clogged it shall "adapt" and connect to another outdoor access point.

In a way, the inventor has described the public Wi-Fi™ network consisting of outdoor access points as some kind of micro-backhaul to those who wish to expand and improve last mile coverage.

Last Mile Contents Delivery (Quasi-Streamed or Downloaded) Using Peer-to-Peer File Sharing Technology Most large media, video, HiFi (High Fidelity) music, are delivered in unicast fashion, media server to client device. It is estimated that about 80% of the heavy media will be delivered in the same way. Unicast delivery is quick and simple most especially since the client devices are within a hop or two from a micro-server.

There will be instances, however, when videos (i.e. multimedia contents) or any large data file (such as a blockchain file) would be more optimally delivered in peer-to-peer fashion, e.g. BitTorrent™ technology, quasi-streamed or downloaded. When a large number of users are watching the same video at the same time in the same cluster or in nearby clusters, the micro-servers and client devices work together to distribute the burden of delivering traffic, each one of them contributing portions of the video; this is referred to as "seeding" while those client devices that choose not to share or only share a small portion of seeded contents are referred to as "leechers." The system is likely to install a policy of making it mandatory that those benefiting from torrent delivered contents to permit the seeding of a relatively higher ratio portion of traffic received. This can be enforced algorithmically, especially when the system has some degree of control over the BitTorrent™ modules or client viewer apps used.

This is also likely to be the case when a video being watched does not exist at the micro-server directly serving the client devices or when the micro-server resources (CPU, RAM and Disk used) are running at capacity. In this scenario, nearby micro-servers and client devices all help in delivering large files such as video contents.

Since the system in accordance with the invention may optimize the backhaul connectivity, the BitTorrent™ technology may be applied to some cases, e.g. where large files are involved. This may be in contrast to the policies of most Internet Service Providers (ISPs). For example, cloud-based storage services such as Dropbox™ or Google™ Drive may impair the performance of the network. As such, in some embodiments, the system in accordance with the invention may have strict policies on the use of cloud-based storage services.

The BitTorrent™ technology may rely on trackers being known to users interested in gaining access to particular large files. Most of the trackers may be kept on registries in the cloud, while most of the users are held inside a Network Address Translation (NAT), in which Wide Area Network (WAN) IP addresses are shared amongst the users. The network design of the invention may therefore be liberal in terms of "hole punching", even proactive in promoting such (e.g. dynamic port forwarding to specific users behind the NAT) so that Internet-based BitTorrent™ registry services may be able to trace back traffic more easily, to particular users, servers, and/or clients within the LAN and/or wireless LAN.

In this regard, it should be appreciated that the hosting of the BitTorrent™ trackers may be by the servers in accordance with the invention. Also, it should be appreciated that the hosting of the BitTorrent™ trackers may be by any of the users in the network.

Internet/Data Privacy and Security Rules and Compliance

Many governments have started controlling and restricting the use of data collected from the user who accesses the Internet. These rules require that data collected not be used or shared for purposes other than what they have told their users. In some countries, for example, an explicit consent given by the user is required.

The typical Facebook™ Login and the social network's terms and conditions are considered by the country's authorities as "good enough"—that which signifies that users agrees that their data be processed and used to push relevant advertisements, recommendations of relevant apps and services, just to name a few examples.

The registration process uses Facebook™ Login and informs the users explicitly in the terms and conditions that the system intends to use data collected from the users, such as browsing activities, Facebook™ data, to deliver advertisements, promote services and contents, including those that are more likely to be purchased by the users (a more relevant data plan—Instagram™ plus Whatsapp™ for $0.10 a day, for example).

Not Just Wi-Fi™, but any Last Mile—A Case for Small Cells and Rural Connectivity An application of the invention in a Wi-Fi™ last-mile and a generic sub-giga wireless backhaul scenario has been described above. It is noted that the invention can be applicable in most situations in which connectivity, wired or wireless, is scarce. In particular, the invention would yield just as significant, if not more dramatic benefits, if used for the delivery of MNO services. Cellular last mile spectrum is more difficult to come by, and in most instances, auctioned off to MNOs who can pay the most and demonstrate their ability to utilize such to its full capacity. Many developing countries have yet to build a national broadband network. For the most part, the MNOs have had to create their own and have been struggling to offer quality service in areas outside the metros.

The invention is particularly suited in providing wireless connectivity via small cell technology and in rural areas where private entities find it likely unprofitable to pull copper or fiber. Compared to the more traditional telecommunication operator cell site installation, small cell technology comes at a fraction of the CAPEX required, has OPEX that can justify covering far fewer subscribers, e.g. in the hundreds, consumes little power, e.g. in the hundred watt range, uses more open-source software which is more easily modified, and runs mostly on wireless backhaul environment—features similar to the economics that govern the provisioning of public Wi-Fi™ services.

In fact, the invention can be applied in situations in which there is poor cellular coverage, urban or rural. This is the case of most developing countries, where the general population's disposable income stretches the MNO's ability to give quality service.

Contents can be localized and cached. Cloud access can be prioritized to critical services, such as real-time communications, e.g. VOIP, video. Peer-to-peer communications, if within the same cluster or area, can occur without having to access an MNO's central server or the cloud. Store-Forward type of data transmission and communication schemes, such as that employed by the Pony Express can be cached at the micro-servers attached to cellular base stations to better manage last mile and backhaul resources.

It is to be appreciated that features from various embodiment(s) may be combined to form one or more additional embodiments.

The invention claimed is:

1. A system for a provision and management of a plurality of web resources originally provisionable from a global internet network for a plurality of users accessing the web resources through a plurality of mobile communication devices, the system including:
   (a) a node server including or in communication with a local cache, the node server configured to:
      (i) monitor a web resource usage behavior of each user;
      (ii) based on at least one characteristic of the web resource usage behavior, classify each web resource as time sensitive or alternatively as non-time sensitive; and
      (iii) store in the local cache a selection of web resources classified as non-time sensitive; and (b) a switch arranged in a signal communication with the node server and configured to switch the provision of the web resources by the users between a first mode and a second mode, wherein upon a request for a selected web resource that is classified as non-time sensitive, the node server provisions the selected web resource:
(i) in the first mode, from the local cache; and
(ii) in the second mode, from the global internet network,
wherein the node server is linked up wirelessly or wired to one or more outdoor Wi-Fi access points;
wherein each outdoor Wi-Fi access point is linked up wirelessly to one or more indoor Wi-Fi access points;
wherein each indoor Wi-Fi access point is linked up wirelessly to one or more of the mobile communication devices;
wherein each mobile communication device is in data communication with the node server via an unstructured data network;
wherein the unstructured data network passes from each mobile communication device, to one or more indoor Wi-Fi access points, to one or more outdoor Wi-Fi access points, to the node server; and
wherein the node server directs the outdoor Wi-Fi access points and indoor Wi-Fi access points to create an un-structured cabling installation to establish the unstructured data network.

2. The system according to claim 1, wherein the switch is further configured to switch the provision of the web resource to a third mode, wherein in the third mode the node server provisions each corresponding web resource that is classified as non-time sensitive from both a server database and the global internet network.

3. The system according to claim 2, wherein the node server comprises at least one of an artificial intelligence engine and machine learning engine.

4. The system according to claim 1, wherein the node server is operable to relay at least one specific web resource to another node server.

5. The system according to claim 1, wherein the node server is operable to synchronize a specific web resource with another node server using a peer-to-peer synchronization program.

6. The system according to claim 1, wherein the node server is operable to access a cloud directly or via another node server.

7. The system according to claim 2, wherein the node server is configured to communicate with a user via a bot operating on a social networking service platform, wherein the bot is operable to generate and send a message.

8. The system according to claim 7, wherein the node server is operable to identify a specific user and determine a specific web resource usage behavior of the specific user based on a specific historical web resource usage profile associated with the specific user.

9. The system according to claim 8, wherein the specific web resource usage profile associated with the specific user is monitored using the social networking service platform.

10. The system according to claim 8, wherein the specific web resource usage behavior of the specific user is determined based on a plurality of historical web resource usage profiles associated with other users in an area which is the same to the user.

11. The system according to claim 8, wherein the node server is operable to determine when to switch to another mode, based on the determined the specific web resource usage behavior of the user.

12. The system according to claim 8, wherein the node server is operable to obtain a user's identifier of the social networking service platform to identify and authenticate the user.

13. The system according to claim 1, wherein the node server is operable to implement a Wi-Fi offloading to mirror a user's mobile data plan with an MNO (Mobile Network Operator).

14. The system according to claim 1, wherein the node server is configured to connect to one or more routers through the local or the global internet network, to share a bandwidth of the node server.

15. The system according to claim 1, wherein the node server is operable to determine a minimum allowable speed of a data connection of a user's device and allow one or more functions among a plurality of functions to operate on the user's device and to offer no more than a certain speed of the data connection.

16. The system according to claim 1, wherein when a plurality of users use same contents at the same time in a same cluster or in nearby clusters, the node server and devices of the plurality of users are operable to contribute portions of the contents to distribute a burden of delivering traffic.

17. A method for providing and managing a plurality of web resources originally provisionable from a global internet network for a plurality of users accessing the web resources through a plurality of mobile communication devices by a node server in a system, the node server including or in communication with a local cache, including the steps of:
a. monitoring a web resource usage behavior of each user;
b. based on at least one characteristic of the web resource usage behavior, classifying each web resource as time sensitive or alternatively as non-time sensitive;
c. storing in the local cache a selection of web resources classified as non-time sensitive; and
d. receiving an electronic signal to control a switch to switch from a first mode and a second mode or vice versa, wherein upon a request for a selected web resource that is classified as non-time sensitive, the node server provisions the selected web resource:
(i) in the first mode, from the local cache; and
(ii) in the second mode, from the global internet network,
wherein the node server is linked up wirelessly or wired to one or more outdoor Wi-Fi access points;
wherein each outdoor Wi-Fi access point is linked up wirelessly to one or more indoor Wi-Fi access points;
wherein each indoor Wi-Fi access point is linked up wirelessly to one or more of the mobile communication devices;
wherein each mobile communication device is in data communication with the node server via an unstructured data network;
wherein the unstructured data network passes from each mobile communication device, to one or more indoor Wi-Fi access points, to one or more outdoor Wi-Fi access points, to the node server; and
wherein the node server directs the outdoor Wi-Fi access points and indoor Wi-Fi access points to create an un-structured cabling installation to establish the unstructured data network.

* * * * *